US011599569B2

(12) United States Patent
Fujii

(10) Patent No.: US 11,599,569 B2
(45) Date of Patent: Mar. 7, 2023

(54) INFORMATION PROCESSING DEVICE, INFORMATION PROCESSING SYSTEM, AND COMPUTER PROGRAM PRODUCT FOR CONVERTING A CAUSAL RELATIONSHIP INTO A GENERALIZED EXPRESSION

(71) Applicant: KABUSHIKI KAISHA TOSHIBA, Minato-ku (JP)

(72) Inventor: Hiroko Fujii, Komae (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 95 days.

(21) Appl. No.: 17/005,420

(22) Filed: Aug. 28, 2020

(65) Prior Publication Data
US 2021/0224307 A1 Jul. 22, 2021

(30) Foreign Application Priority Data
Jan. 21, 2020 (JP) .............................. JP2020-007504

(51) Int. Cl.
*G06F 16/35* (2019.01)
*G06F 16/34* (2019.01)
(Continued)

(52) U.S. Cl.
CPC .......... *G06F 16/358* (2019.01); *G06F 16/345* (2019.01); *G06N 20/00* (2019.01); *G06V 30/413* (2022.01); *G06V 30/414* (2022.01)

(58) Field of Classification Search
CPC .... G06F 40/30; G06F 16/3323; G06F 16/358; G06F 16/345; G06F 16/93; G06F 16/353;
(Continued)

(56) References Cited

U.S. PATENT DOCUMENTS

2013/0212475 A1* 8/2013 Lee ...................... G06F 40/284
715/261
2015/0310128 A1* 10/2015 Brav ................... G06F 16/9024
707/800
(Continued)

FOREIGN PATENT DOCUMENTS

JP 2008-226168 A 9/2008

OTHER PUBLICATIONS

Kruengkrai et al., "Improving Event Causality Recognition with Multiple Background Knowledge Sources Using Multi-Column Convolutional Neural Networks", Proceedings of the Thirty-First AAAI Conference on Artificial Intelligence (AAAI-17), 2017, pp. 3466-3473.
(Continued)

*Primary Examiner* — Yuk Ting Choi
(74) *Attorney, Agent, or Firm* — Oblon, McClelland, Maier & Neustadt, L.L.P.

(57) ABSTRACT

An information processing device includes one or more hardware processors. The hardware processors acquire a causal relationship included in a target document that is a specific document from causal relationship management information in which one or a plurality of causal relationships are registered, which are extracted from one or a plurality of documents and each which includes a set of a first element and a second element having a relationship; acquire a similar expression of the causal relationship included in the target document based on feature management information in which features of a plurality of words included in one or a plurality of documents are registered; and acquire a generalized expression of the causal relationship included in the target document based on the causal relationship included in the target document and the similar expression.

12 Claims, 17 Drawing Sheets

(51) Int. Cl.
*G06N 20/00* (2019.01)
*G06V 30/413* (2022.01)
*G06V 30/414* (2022.01)

(58) Field of Classification Search
CPC ........ G06F 16/38; G06F 40/289; G06F 16/54;
G06N 20/00; G06N 3/08; G06N 5/025;
G06N 5/022; G06V 30/413; G06V
30/414; G06K 9/6215
See application file for complete search history.

(56) References Cited

U.S. PATENT DOCUMENTS

| | | | | |
|---|---|---|---|---|
| 2015/0379610 | A1* | 12/2015 | Stankiewicz | G06F 16/24578 705/26.7 |
| 2017/0024652 | A1* | 1/2017 | Kipersztok | G06N 7/005 707/800 |
| 2020/0334307 | A1* | 10/2020 | Prasad | G06F 16/24578 715/261 |

OTHER PUBLICATIONS

Sakaji et al., "Extracting Causal Expressions From PDF Files of Summary of Financial Statements", vol. J98-D, No. 5, 35 pages, 2015, (with English Translation).

Zhao et al., "Ngram2vec: Learning Improved Word Representation from Ngram Co-occurrence Statistics", Proceedings of the 2017 Conference of Empirical Methods in Natural Language Processing, 2017, pp. 244-253.

\* cited by examiner

[TITLE] OO WATER LEAK

[PHENOMENON] WATER LEAK FROM OO SUPPORT WELDING PORTION

[CAUSE] WATER LEAK FROM SUPPORT WELDING PORTION DUE TO SHAKING FROM ROTATING EQUIPMENT FRAME WAS CONFIRMED.
SUPPORT OO FROM XX, BUT BECAUSE CRACK OCCURS IN WELDING PORTION OF OO SUPPORT PORTION DUE TO SHAKING OF EQUIPMENT FRAME.

[COUNTERMEASURE] COPE WITH BY X△ING △△.
TO □□ SO AS NOT TO BE AFFECTED BY VIBRATION OF FRAME.

[PRODUCT NAME] PRODUCT A

FIG.4

DOCUMENT MANAGEMENT INFORMATION

| DOCUMENT ID | CATEGORY | DOCUMENT |
|---|---|---|
| 1011 | PRODUCT A | [TITLE] ○○ WATER LEAK [PHENOMENON] ○○ WATER LEAK FROM ○○ SUPPORT WELDING PORTION...... |
| 1012 | PRODUCT B | [TITLE] ○△ DAMAGE [PHENOMENON]......[CAUSE]......[COUNTERMEASURE]...... |
| 1013 | PRODUCT C | [TITLE] △△ MEMORY LEAK [PHENOMENON].................. |

FEATURE MANAGEMENT INFORMATION

| WORD | FEATURE | NUMBER INCLUDED IN EACH CATEGORY |
|---|---|---|
| SHAKING | [-0.124, 0.001, -0.009, ············, 0.0265] | [125, 12, 0, 0] |
| VIBRATION | [-0.122, 0.001, -0.0085, ············, 0.0245] | [200, 10, 5, 0] |
| ROTATING EQUIPMENT | [0.0245, -0.005, 0.0034, ············, 0.012] | [22, 0, 15, 4] |
| WATER LEAK | [0.007, 0.0245, -0.012, ············, -0.035] | [45, 2, 0, 50] |

FIG.14

GENERALIZED MANAGEMENT INFORMATION 12E

| GENERALIZED ID | GENERALIZED EXPRESSION ||
| --- | --- | --- |
| | GENERALIZED EXPRESSION OF CAUSE | GENERALIZED EXPRESSION OF RESULT |
| 1 | INTERFERENCE FROM PERIPHERAL PARTS | CRACK IN EQUIPMENT |
| 2 | MIXING NOISE | SUBSTRATE FAILURE |
| 3 | LACK OF RESOURCES | ABNORMAL TERMINATION OF SYSTEM |

44A  44B

INFORMATION PROCESSING DEVICE, INFORMATION PROCESSING SYSTEM, AND COMPUTER PROGRAM PRODUCT FOR CONVERTING A CAUSAL RELATIONSHIP INTO A GENERALIZED EXPRESSION

CROSS-REFERENCE TO RELATED APPLICATIONS

This application is based upon and claims the benefit of priority from Japanese Patent Application No. 2020-007504, filed on Jan. 21, 2020; the entire contents of which are incorporated herein by reference.

FIELD

Embodiments described herein relate generally to an information processing device, an information processing system, and a computer program product.

BACKGROUND

There is known a system for searching for a document including a search character string or a similar character string similar to the search character string from a plurality of documents. For example, a sentence including important words written in a previously created important word dictionary is extracted from sentences to be searched, and the extracted sentence is converted using a generalized dictionary. Then, phrases having a causal relationship included in the converted sentence are extracted, and a causal relationship network in which the phrases are connected is generated. Then, there is disclosed a system for searching for a case similar to an input text by matching a causal relationship included in the input text and a causal network.

However, conventionally, in order to obtain a causal relationship of a generalized expression, it is necessary to prepare an important word dictionary and a generalized dictionary in advance, and the maintenance of the dictionaries is necessary. In addition, in order to obtain a generalized expression of the causal relationship included in a plurality of documents in different categories, it is necessary to perform conversion in consideration of the meaning of the causal relationship, not simple conversion. Therefore, in the conventional technology, it may be difficult to improve a conversion efficiency of the causal relationship included in a target document into the generalized expression.

BRIEF DESCRIPTION OF THE DRAWINGS

FIG. 3 is a schematic diagram of a document according to the embodiment;

FIG. 4 is a schematic diagram illustrating a data configuration of document management information according to the embodiment;

FIG. 6 is a schematic diagram illustrating a data configuration of feature management information according to the embodiment;

FIG. 14 is a schematic diagram of a data configuration of generalized management information according to the embodiment;

DETAILED DESCRIPTION

According to an embodiment, an information processing device includes one or more hardware processors. The hardware processors acquire a causal relationship included in a target document that is a specific document from causal relationship management information in which one or a plurality of causal relationships are registered, the one or the plurality of causal relationships being extracted from one or a plurality of documents and each including a set of a first element and a second element having a relationship; acquire a similar expression of the causal relationship included in the target document, based on feature management information in which features of a plurality of words included in the one or the plurality of document are registered; and acquire a generalized expression of the causal relationship included in the target document, based on the causal relationship included in the target document and the similar expression.

An information processing device, an information processing system, and a computer program product according to the present embodiment will be described below in detail with reference to the accompanying drawings.

Figure 1:
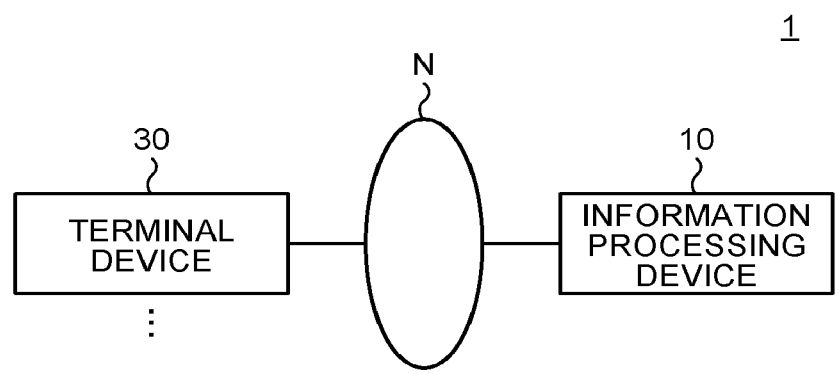
FIG. 1 is a schematic diagram of an information processing system according to an embodiment.

FIG. 1 is a schematic diagram illustrating an example of an information processing system 1 of the present embodiment.

The information processing system 1 includes an information processing device 10 and a terminal device 30. The information processing device 10 and the terminal device 30 are communicably connected via a wireless or wired communication network such as a network N.

The information processing device 10 is a dedicated or general-purpose computer. In the present embodiment, the information processing device 10 executes processing described later on a document. Details of the document and the processing will be described later.

The terminal device 30 is a computer operated by a user. The terminal device 30 is, for example, a computer, a mobile terminal, a smartphone, or the like, but is not limited to thereto.

Note that FIG. 1 illustrates, as an example, a configuration in which the information processing system 1 includes one information processing device 10 and one terminal device 30. However, the information processing system 1 may be configured to include one or a plurality of information processing devices 10 and one or a plurality of terminal devices 30.

Figure 2:
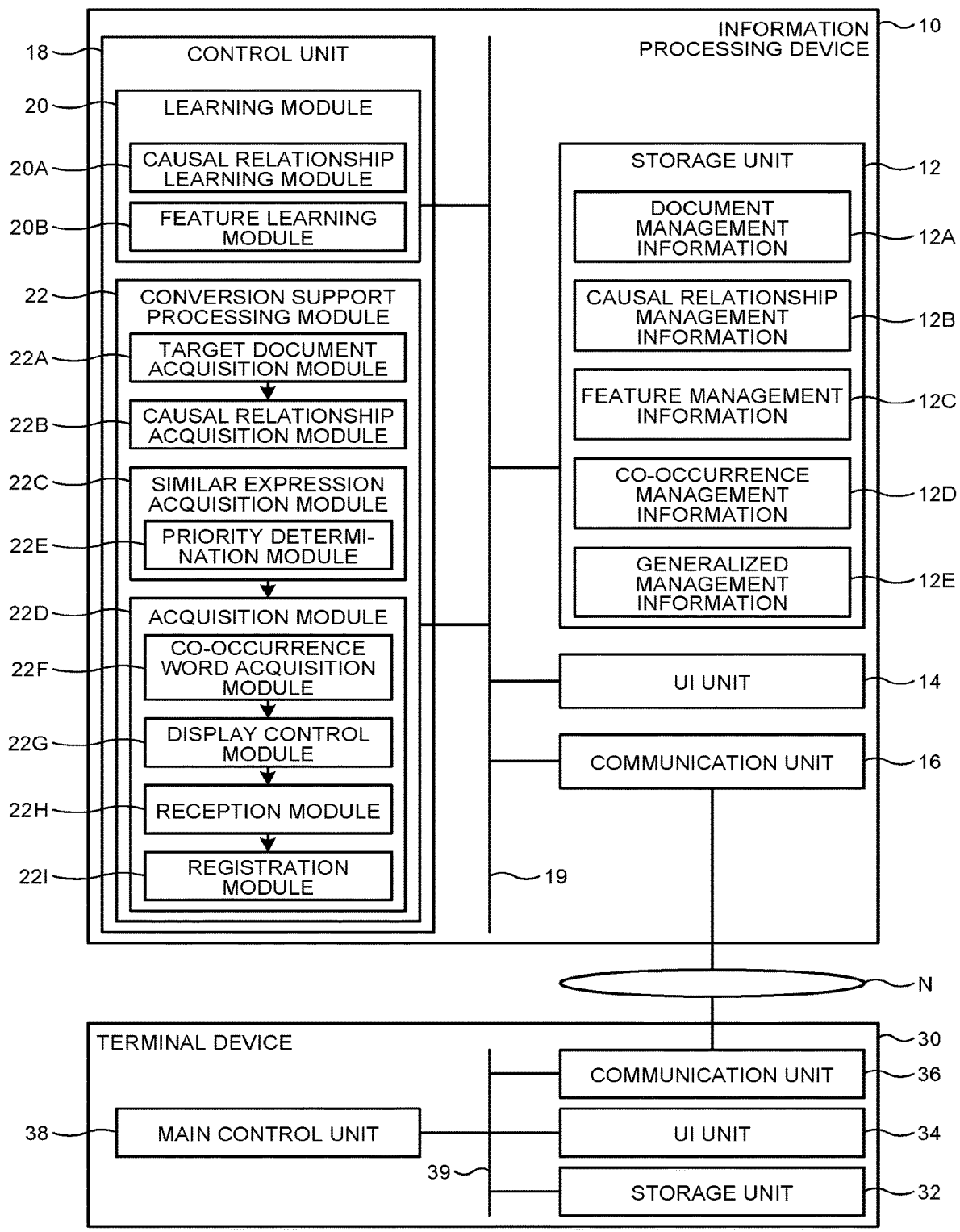
FIG. 2 is a block diagram illustrating a functional configuration of each of an information processing device and a terminal device according to the embodiment.

FIG. 2 is a block diagram illustrating an example of a functional configuration of each of the information processing device 10 and the terminal device 30 of the present embodiment.

In the present embodiment, the terminal device 30 is a device operated by a user when communicating with the information processing device 10.

The terminal device 30 includes a storage unit 32, a user interface (UI) unit 34, a communication unit 36, and a main control unit 38. The storage unit 32, the UI unit 34, the communication unit 36, and the main control unit 38 are connected via a bus 39 so that data or signals can be exchanged.

The storage unit 32 stores various data. The storage unit 32 is, for example, a random access memory (RAM), a semiconductor memory element such as a flash memory, a hard disk, an optical disk, or the like. Note that the storage unit 32 may be a storage medium. Specifically, the storage medium may be one in which programs and various types of information are downloaded and stored or temporarily stored via a local area network (LAN), the Internet, or the like. In addition, the storage unit 32 may be configured by a plurality of storage media.

The communication unit 36 communicates with the information processing device 10 via the network N. The UI unit 34 has a function of receiving an operation input by the user and a function of outputting various types of information.

For example, the UI unit 34 includes a display and an input unit. The display displays various types of information. The display is, for example, a known organic electroluminescence (EL) display, liquid crystal display (LCD), projection device, or the like. The input unit receives various instructions from the user. The input unit is, for example, a keyboard, a mouse, a touch panel, a microphone, or the like. Note that the UI unit 34 may be configured with a touch panel having an input mechanism and an output mechanism. In addition, the UI unit 34 may further include a speaker that outputs a sound. The main control unit 38 controls each unit of an electronically controllable device provided in the terminal device 30.

Next, the information processing device 10 will be described.

The information processing device 10 includes a storage unit 12, a UI unit 14, a communication unit 16, and a control unit 18. The storage unit 12, the UI unit 14, the communication unit 16, and the control unit 18 are connected via a bus 19 so that data or signals can be exchanged.

At least one of the storage unit 12 and the UI unit 14 may be connected to the control unit 18 via the network N. That is, at least one of the storage unit 12 and the UI unit 14 may be provided in an external device connected to the information processing device 10 via the network N. In addition, at least one of the functional units described later included in the control unit 18 may be provided in the external device. The external device is, for example, an external server.

The storage unit 12 stores various data. The storage unit 12 is, for example, a RAM, a semiconductor memory device such as a flash memory, a hard disk, an optical disk, or the like. The storage unit 12 may be a storage device provided outside the information processing device 10. In addition, the storage unit 12 may be a storage medium. Specifically, the storage medium may be one in which programs and various types of information are downloaded and stored or temporarily stored via a local area network (LAN), the Internet, or the like. The storage unit 12 may be configured by a plurality of storage media.

In the present embodiment, the storage unit 12 stores document management information 12A, causal relationship management information 12B, feature management information 12C, co-occurrence management information 12D, and generalized management information 12E. Details of the information will be described later.

The UI unit 14 has a function of receiving an operation input by the user and a function of outputting various types of information. For example, the UI unit 14 includes a display and an input unit. An example of the display and the input unit is the same as the UI unit 34. The communication unit 16 communicates with the terminal device 30 via the network N.

The control unit 18 includes a learning module 20 and a conversion support processing module 22. The learning module 20 includes a causal relationship learning module 20A and a feature learning module 20B. The conversion support processing module 22 includes a target document acquisition module 22A, a causal relationship acquisition module 22B, a similar expression acquisition module 22C, and an acquisition module 22D. The similar expression acquisition module 22C includes a priority determination module 22E. The acquisition module 22D includes a co-occurrence word acquisition module 22F, a display control module 22G, a reception module 22H, and a registration module 22I.

At least one of the learning module 20, the causal relationship learning module 20A, the feature learning module 20B, the conversion support processing module 22, the target document acquisition module 22A, the causal relationship acquisition module 22B, the similar expression acquisition module 22C, the acquisition module 22D, the priority determination module 22E, the co-occurrence word acquisition module 22F, the display control module 22G, the reception module 22H, and the registration module 22I is realized by, for example, one or more processors. For example, each of the modules may be realized by causing a processor such as a central processing unit (CPU) to execute a program, that is, by software. Each of the modules may be realized by a processor such as a dedicated integrated circuit (IC), that is, hardware. Each of the modules may be realized by using software and hardware in combination. When using a plurality of processors, each processor may realize one of the modules or two or more of the modules.

The learning module 20 is a functional unit that executes machine learning based on a document.

The document is data that includes a plurality of words. The word is a morpheme. The morpheme is the smallest unit of a meaningful expression element. The document is, for example, a report or case data of meetings, experiments, various phenomena, and various projects.

Specifically, for example, the document is case data of troubles that occurred in the past in design, manufacturing, and operation in vehicles, aircraft, various products, various projects, and the like. Design includes, for example, product design of thermal power, hydraulic power, and nuclear power plants, building air conditioning management systems, water and sewer management systems, and the like. In addition, the document may be a document of a rule kind of a technical field related to the product or the like.

Experimental data, which is an example of the report, includes experimental conditions and data indicating experimental results. The case data may include a title, a phenomenon, a cause of the phenomenon, a countermeasure against the cause, a corresponding product name, and the like. In addition, the report may include data indicating a problem and an effect on the problem. In addition, the case data may include data indicating a cause of a specific phenomenon and a result of the cause, and the like. In addition, the document may include data time-serially or conceptually indicating a higher order phenomenon and a lower order phenomenon having a relationship related to the higher order phenomenon.

FIG. 3 is a schematic diagram illustrating an example of a document 40. FIG. 3 illustrates case data of a trouble as an example of the document 40. For example, the document 40 includes words regarding a title of the document 40, a phenomenon that is the content of the trouble, a cause of the phenomenon, a countermeasure against the phenomenon, a product name in which the phenomenon occurs, and the like.

Note that the content included in the document 40 is not limited to the content illustrated in FIG. 3. In addition, a format of the document 40 is not limited to the format illustrated in FIG. 3.

Returning to FIG. 2, the description will be continued. In the present embodiment, a plurality of documents 40 are registered in the document management information 12A in advance.

FIG. 4 is a schematic diagram illustrating an example of a data configuration of the document management information 12A. The document management information 12A is a database in which a document ID, a category, and the document 40 are associated with each other. A data format of the document management information 12A is not limited to the database.

The document ID is identification information for identifying the corresponding document 40. The category is a name of each group when the plurality of documents 40 are classified into a plurality of groups according to a predetermined classification condition. The category is, for example, a product, a field, an industry, a management department, a date, a time period, or the like.

A category of the corresponding document 40 is registered in the document management information 12A. FIG. 4 illustrates an example of a case in which the category is the product name. That is, FIG. 4 illustrates, as an example, a form in which the category indicating which product the document 40 belongs to is registered in the document management information 12A in advance. Note that, as described above, the category is not limited to the product name.

In the present embodiment, a form in which documents 40A to 40C are registered in the document management information 12A in advance as the plurality of documents 40 is described as an example. Note that it is sufficient that at least one document 40 is registered in the document management information 12A in advance, and the number of registered documents 40 is not limited to three.

Returning to FIG. 2, the description will be continued. In the present embodiment, the learning module 20 uses the document management information 12A to execute machine learning. The learning module 20 includes a causal relationship learning module 20A and a feature learning module 20B.

The causal relationship learning module 20A extracts a causal relationship included in the document 40 registered in the document management information 12A based on the document management information 12A and registers the extracted causal relationship in the causal relationship management information 12B.

The causal relationship is data configured by a set of a first element and a second element having a relationship. The set of the first element and the second element is, for example, a cause and a result, a condition and a result or a conclusion, a problem and an effect, a higher element and a lower element, and the like. The higher element is an element that represents a higher phenomenon in a time series or conceptually. The lower element is an element that represents a lower phenomenon having a relationship with the higher element.

The first element and the second element are represented by a group of one or a plurality of words.

In the present embodiment, the case where the set of the first element and the second element having the relationship is a set of the cause and the result will be described as an example. Note that as described above, the set of the first element and the second element is not limited to the set of the cause and the result.

The causal relationship learning module 20A extracts a causal relationship included in each of the plurality of documents 40 from the plurality of documents 40 registered in the document management information 12A. The causal relationship learning module 20A extracts a plurality of causal relationships including the set of the cause and the result from each of the plurality of documents 40 (document 40A to document 40C) using a known technique.

For example, in order to extract the causal relationship by the causal relationship learning module 20A, a machine learning method illustrated in Document 1 or a pattern matching illustrated in Document 2 may be used.

Document 1: Kruengkrai et al., Improving Event Causality Recognition With Multiple Background Knowledge Sources Using Multi-Column Convolutional Neural Networks, AAAI'17 Proceedings of the Thirty-First AAAI Conference on Artificial Intelligence, pp. 3466-3473, 2017

Document 2: Sakaji et al., Extraction of cause/result expressions from PDF of financial results, IEICE Transactions D, Vol. J98-D, NO. 5, pp. 811-822, 2015

The causal relationship learning module 20A registers the causal relationship extracted from each of the plurality of documents 40 (document 40A to document 40B) in the causal relationship management information 12B. Therefore, the causal relationship management information 12B is in a state in which one or a plurality of causal relationships extracted from each of one or a plurality of documents 40 and configured by the set of the first element and the second element having the relationship are registered.

Figure 5:
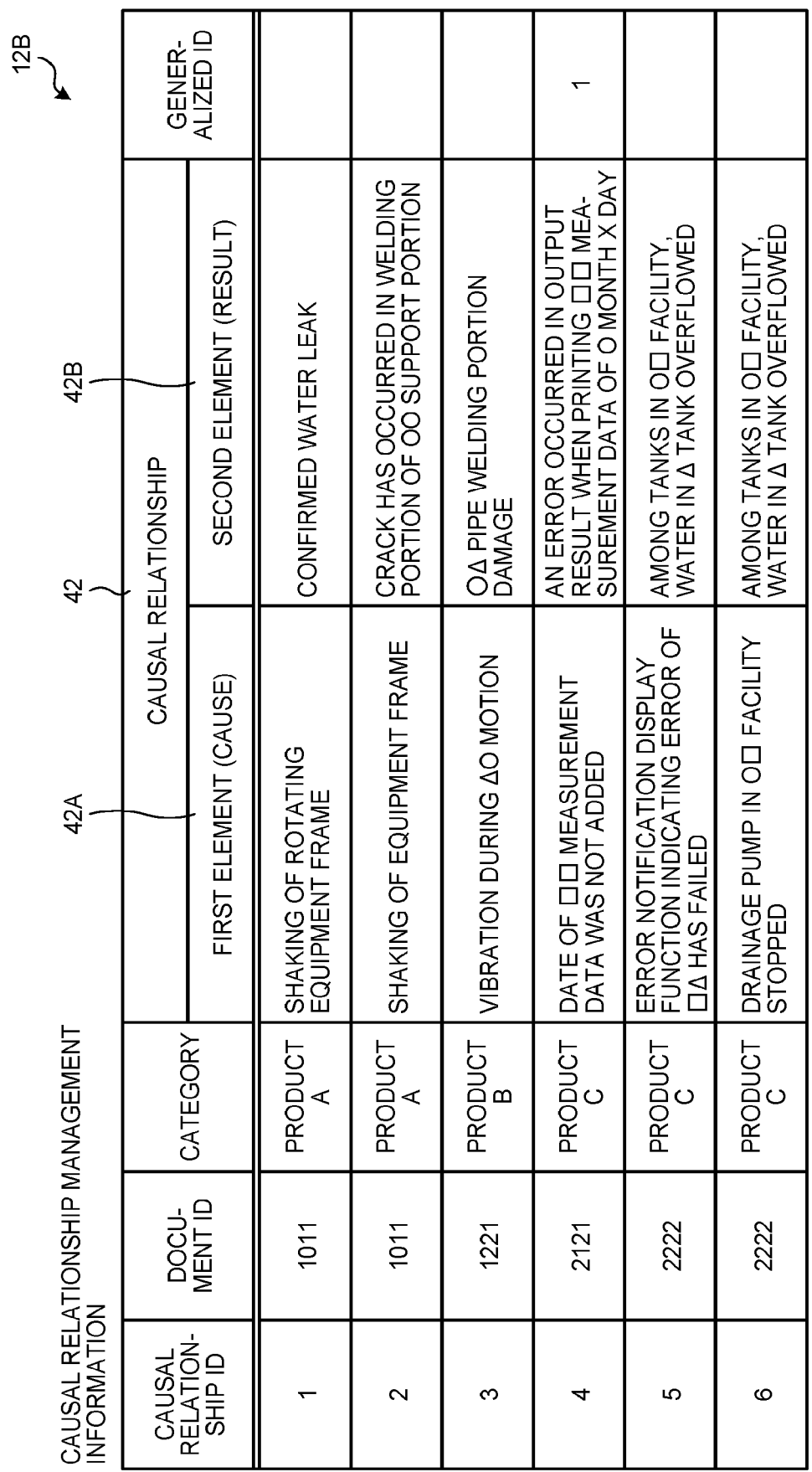
FIG. 5 is a schematic diagram illustrating a data configuration of causal relationship management information according to the embodiment.

FIG. 5 is a schematic diagram illustrating an example of a data configuration of the causal relationship management information 12B. The causal relationship management information 12B is a database in which a causal relationship ID, a document ID, a category, a causal relationship 42, and a generalized ID are associated with each other. A data format of the causal relationship management information 12B is not limited to the database.

The causal relationship ID is identification information of the corresponding causal relationship 42. The causal relationship 42 includes a first element and a second element. As described above, in the present embodiment, the case where the set of the first element and the second element is the set of the cause and the result will be described as an example. Therefore, in the following, the case where the causal relationship 42 is data of a set of a cause 42A and a result 42B will be described as an example. The generalized ID is identification information of a generalized expression of the causal relationship 42. Details of the generalized expression will be described later.

Returning to FIG. 2, the description will be continued. The feature learning module 20B learns a feature of each of a plurality of words included in each of the one or the plurality of documents 40 and registers the feature in the feature management information 12C.

FIG. 6 is a schematic diagram illustrating an example of a data configuration of the feature management information 12C. The feature management information 12C is a database that associates words, features, and the number included in each category. The words registered in the feature management information 12C are words included in each of the plurality of documents 40 registered in the document management information 12A.

The feature is data indicating the feature of the corresponding word. The feature is represented by, for example, a vector expression acquired from the relationship with preceding and succeeding words for each of the words included in the document 40.

The feature management information 12C uses each of the words included in the document 40 as learning data and learns a vector expression of a phrase by an extension learning method in which the word embedding technique is extended to n-gram (n consecutive words, hereinafter, also referred to as a phrase). The word embedding technique regards a sequence of words arranged before and after a learning target word as the context of the learning target word. In the word embedding technique, a neural network is used to learn the vector expression of the word so that words that are semantically similar are arranged to close to each other in a vector space. The vector expression of the word is sometimes referred to as an embedded vector.

Through such learning, the feature management information 12C learns the vector expression of each of the words included in the document 40. Note that as the extension learning method, for example, a method illustrated in Document 3 below may be used.

Document 3: Zhao et al., Ngram2vec: Learning Improved Word Representations from Ngram Co-occurrence Statistics, Proceedings of the 2017 Conference on Empirical Methods in Natural Language Processing, pp. 244-253, 2017

The number included in each category is information indicating how many corresponding words are included in the document 40 belonging to each of the plurality of categories. As an example, FIG. 6 illustrates numerical values indicating how many corresponding words are included in each of four categories. Specifically, [125,12,0,0] means that 125 words of "shaking" are included in the document 40 belonging to a category "Product A", 12 words of "shaking" are included in the document 40 belonging to a category "Product B", and 0 word of "shaking" is included in the document 40 belonging to categories "Product C" and "Product D".

The feature learning module 20B acquires the number included in each group of the documents 40 belonging to each category by using a known analysis method for each word included in each of the plurality of documents 40.

Then, the feature learning module 20B may register the acquisition result in the feature management information 12C as the number included in each category of each of the words.

Returning to FIG. 2, the description will be continued. Every time the learning module 20 acquires a new document 40 via the external device or the UI unit 14, the learning module 20 may register the acquired document 40 in the document management information 12A. In addition, when the document 40 is registered in the document management information 12A, the learning module 20 may specify a category of the document 40 by a known method, assign a document ID, and register the document 40 in the document management information 12A. For example, the learning module 20 may search for a word included in the document 40, which is an identification target of the category, and use the search result to specify the category. Note that the document management information 12A may use a category input by the user when registering the document 40 in the document management information 12A as the category of the document 40.

In addition, in the learning module 20, each time the new document 40 is registered in the document management information 12A, each of the causal relationship learning module 20A and the feature learning module 20B performs the learning processing. Therefore, the learning module 20 can register the learning result using all the documents 40 registered in the document management information 12A in the causal relationship management information 12B and the feature management information 12C.

Next, the conversion support processing module 22 will be described.

The conversion support processing module 22 executes processing for supporting a conversion of the causal relationship 42 included in the document 40 into a generalized expression.

The conversion into the generalized expression means converting at least one of the cause 42A and the result 42B included in the causal relationship 42 to a generalized expression that is not limited to a specific expression within a category. That is, the generalized expression means a generalized expression that is not limited to the specific expression within the category.

The conversion support processing module 22 includes a target document acquisition module 22A, a causal relationship acquisition module 22B, a similar expression acquisition module 22C, and an acquisition module 22D.

The target document acquisition module 22A acquires a target document. The target document is a document 40 including a causal relationship 42 of a conversion target into the generalized expression. In other words, the target document is one specific document 40 among the plurality of documents 40 registered in the document management information 12A.

The target document acquisition module 22A acquires, for example, the document 40 selected by the user among the plurality of documents 40 registered in the document management information 12A as the target document.

In this case, the target document acquisition module 22A displays, for example, a display screen for selecting the target document, and controls to accept an operation from the user.

For example, the target document acquisition module 22A displays the display screen on the UI unit 34 of the terminal device 30 operated by the user. Note that the conversion support function executed by the conversion support processing module 22 of the present embodiment is provided in advance to the terminal device 30 as a Web application, for example. For example, the user uses the conversion support function via a Web browser installed in the terminal device 30.

Figure 7:
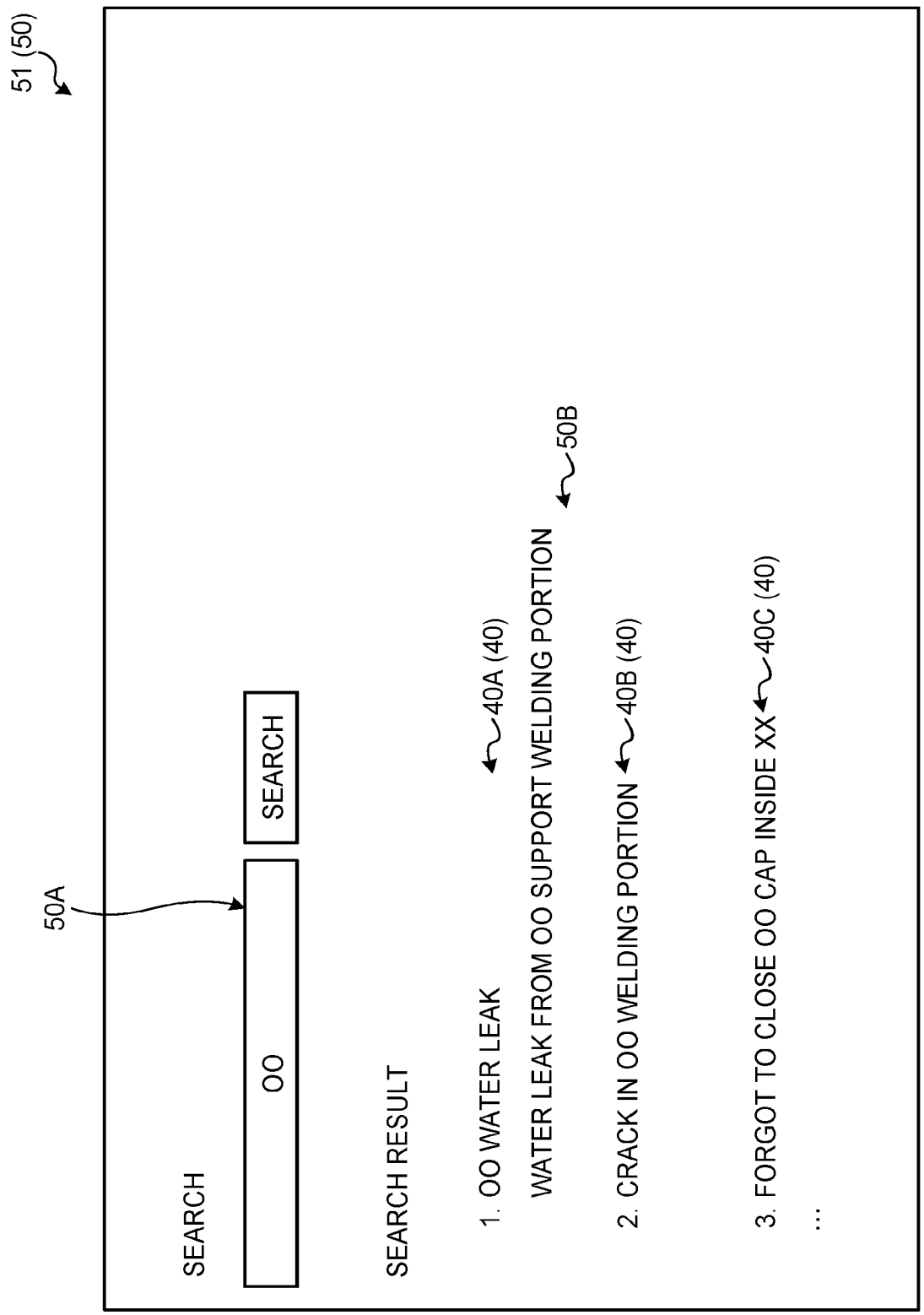
FIG. 7 is a schematic diagram of a display screen according to the embodiment.

FIG. 7 is a schematic diagram illustrating an example of a display screen 51 displayed on the UI unit 34. The display screen 51 is an example of a display screen 50. The display screen 50 is an example of an interface screen displayed on a Web browser screen of the UI unit 34 when the terminal device 30 accesses the conversion support function via the Web browser.

The display screen 51 includes a search query input field 50A and a list display area 50B. The search query input field 50A is a search query input field. The list display area 50B is a display area of a list of the searched documents 40.

For example, the user inputs a search query of the document 40 to be searched to the search query input field 50A. Then, the main control unit 38 of the terminal device 30 transmits the search query to the information processing device 10 via the communication unit 36. The target document acquisition module 22A of the information processing device 10 searches for the document 40 corresponding to the received search query from the document management information 12A, and transmits the searched document to the terminal device 30 via the communication unit 16. Then, the main control unit 38 of the terminal device 30 displays the list of the documents 40 received from the information processing device 10 in the list display area 50B of the display screen 51.

Therefore, the list of the documents 40 is displayed on the display screen 51. The user selects a document 40 to be converted into the generalized expression from the plurality of documents 40 displayed in the list display area 50B. The terminal device 30 transmits the document 40 or the document ID of the document 40 for which the selection is accepted to the information processing device 10 via the communication unit 36. The target document acquisition module 22A acquires the document 40 received from the terminal device 30 or the document 40 corresponding to the document ID as a target document.

In the present embodiment, an example in which the document 40A illustrated in FIG. 3 is acquired as the target document 41 will be described as an example.

Returning to FIG. 2, the description will be continued. The causal relationship acquisition module 22B acquires the causal relationship 42 included in the target document 41 from the causal relationship management information 12B. The causal relationship acquisition module 22B acquires the causal relationship 42 by reading one or a plurality of causal relationships 42 corresponding to the document ID of the target document 41 from the causal relationship management information 12B.

The causal relationship acquisition module 22B may acquire the causal relationship 42 selected by the user from the plurality of causal relationships 42 acquired from the causal relationship management information 12B.

In this case, the causal relationship acquisition module 22B displays a list of the plurality of causal relationships 42 included in the target document 41 on the UI unit 34 of the terminal device 30. The user selects a desired causal relationship 42 with reference to the UI unit 34. The main control unit 38 of the terminal device 30 transmits the causal relationship 42 or the causal relationship ID of the causal relationship 42 received from the UI unit 34 to the information processing device 10 via the communication unit 36. Then, the causal relationship acquisition module 22B of the information processing device 10 may acquire the causal relationship 42 selected by the user by receiving the causal relationship 42 or the causal relationship ID from the terminal device 30. Note that when the causal relationship ID is received, the causal relationship acquisition module 22B may acquire the causal relationship 42 by reading the causal relationship 42 corresponding to the causal relationship ID from the causal relationship management information 12B.

Next, the similar expression acquisition module 22C will be described. The similar expression acquisition module 22C acquires a similar expression of the causal relationship 42 included in the target document 41 based on the feature management information 12C.

The similar expression is an expression similar to at least one of the cause 42A and the result 42B included in the causal relationship 42. The similar expression acquisition module 22C acquires a group of words having a feature similar to each of the words that constitute the causal relationship 42 in the target document 41 among the words registered in the feature management information 12C as the similar expression of the causal relationship 42. The similar expression acquisition module 22C specifies words that constitute each of the causal relationships 42 (cause 42A and result 42B) by morphologically analyzing the causal relationships 42 included in the target document 41. Then, the similar expression acquisition module 22C specifies the specified words, that is, a group of words having a feature similar to a phrase that is a morpheme or a continuous morpheme string from the feature management information 12C, and acquires the specified words as the similar expression 43.

This will be described with reference to FIG. 6. For example, the description will be made by assuming that the similar expression acquisition module 22C acquires a similar expression of "shaking", which is a word included in the cause 42A, as a word that constitutes the causal relationship 42 in the target document 41. In this case, the similar expression acquisition module 22C specifies, for example, "vibration" as a word similar to the vector expression that is the feature of the word "shaking" among the words registered in the feature management information 12C. The similar expression acquisition module 22C may acquire, as the similar expression, another word having a similarity score with the target word for which the similar expression is acquired that is a threshold value or more.

Specifically, the similar expression acquisition module 22C calculates a similarity score with the vector expression that is the feature of the word "shaking", for example, by a cosine distance, for each of the words registered in the causal relationship management information 12B. Then, the similar expression acquisition module 22C acquires, as the similar expressions of the word "shaking", words having similarity scores exceeding a predetermined threshold value in the descending order of the similarity scores. Note that the threshold value is not limited to the similarity score. For example, the threshold value may be set to the maximum number of words acquired as the similar expression.

Then, the similar expression acquisition module 22C acquires the similar expression for each word included in each of the cause 42A and the result 42B included in the causal relationship 42 in the same manner as that described above. Through such processing, the similar expression acquisition module 22C acquires the similar expression of the cause 42A and the similar expression of the result 42B as the similar expression of the causal relationship 42.

Note that the similar expression acquisition module 22C may acquire a word having a high priority among the similar words as the similar expression. In this case, the similar expression acquisition module 22C may be configured to include a priority determination module 22E (see FIG. 2).

The priority determination module 22E determines a priority of each of the words registered in the feature management information 12C. The priority determination module 22E may determine the priority of each of the words using a predetermined determination condition.

For example, the priority determination module 22E specifies the category to which the target document 41 belongs. Then, the priority determination module 22E determines a higher priority as the more words are included in other categories other than the specified category. This will be described with reference to FIG. 6. For example, it is assumed that the category of the document 40A acquired as the target document 41 is "product A" (see FIG. 4). In this case, the priority determination module 22E determines the higher priority as the more words are included in at least one of "Product B", "Product C", and "Product D" that are categories other than "Product A", for each of the words registered in the feature management information 12C.

Then, the similar expression acquisition module 22C determines a group of words having the determined priority higher than a first priority among other words whose features are similar to the words that constitute the causal relationship 42 in the target document 41, as the similar expression of the causal relationship 42. The first priority may be set in advance.

For example, it is assumed that the priority determination module 22E calculates (total of numbers included in categories other than category of target word)/(number included in category of target word) as the priority in a priority calculation method. In this case, the similar expression acquisition module 22C may set the first priority to "1.0" and acquire a group of words higher than the first priority as the similar expression of the causal relationship 42, for example.

In addition, the similar expression acquisition module 22C may acquire, as the similar expression of the causal relationship 42, a predetermined number of words from the higher order in the order of the determined priority, among other words having similar features.

The similar expression acquisition module 22C may acquire the similar expression by targeting only a word having a predetermined part of speech among the parts of speech of the words included in the causal relationship 42 of the target document 41. For example, the similar expression acquisition module 22C specifies the part of speech of the word included in the causal relationship 42 of the target document 41. The part of speech is, for example, a verb, an adjective, an adjective verb, a noun, an adverb, an adnominal, a conjunction, an interjection, an auxiliary verb, a particle, or the like. For example, the similar expression acquisition module 22C may select only a word whose part of speech is a noun from among the words included in the causal relationship 42, and then, the similar expression acquisition module 22C may acquire, as the similar expression, a group of words whose part of speech is the noun among words having similar features to the selected word.

For each of the causal relationships 42 included in the target document 41, the similar expression acquisition module 22C executes the processing described above for each word that constitutes each of the cause 42A and the result 42B that constitute the causal relationship 42. Through the processing, the similar expression acquisition module 22C acquires the similar expressions of the cause 42A and the result 42B for each of the one or the plurality of causal relationships 42 included in the target document 41.

Next, the acquisition module 22D will be described. The acquisition module 22D acquires a generalized expression of the causal relationship 42 included in the target document 41 based on the causal relationship 42 included in the target document 41 and the similar expression. The acquisition module 22D may acquire the generalized expression of the causal relationship 42 included in the target document 41 based on the causal relationship 42 included in the target document 41, the similar expression, and the co-occurrence word.

In the present embodiment, the acquisition module 22D includes a co-occurrence word acquisition module 22F, a display control module 22G, a reception module 22H, and a registration module 22I.

The co-occurrence word acquisition module 22F acquires a co-occurrence word of the words that constitute the causal relationship 42 included in the target document 41. The co-occurrence word is another word that has a high probability of being used together with the word.

In the present embodiment, the co-occurrence word acquisition module 22F acquires the co-occurrence word using the co-occurrence management information 12D.

Figure 8:
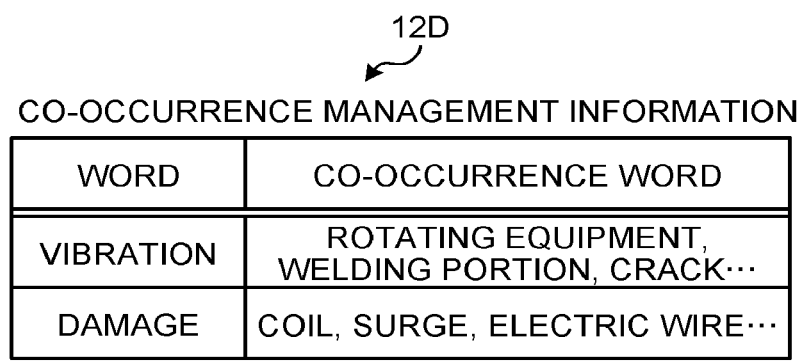
FIG. 8 is a schematic diagram illustrating a data configuration of co-occurrence management information according to the embodiment.

FIG. 8 is a schematic diagram illustrating an example of a data configuration of the co-occurrence management information 12D. The co-occurrence management information 12D is a database in which words are associated with one or a plurality of co-occurrence words for the words. The data configuration of the co-occurrence management information 12D is not limited to the database.

The co-occurrence management information 12D may be stored in the storage unit 12 in advance. For example, the information processing device 10 may acquire the co-occurrence management information 12D from the external device via the network N and store the co-occurrence management information 12D in the storage unit 12. In addition, for example, the information processing device 10 extracts a plurality of words included in each of the plurality of documents 40 registered in the document management information 12A and uses each of the plurality of extracted words. Then, the information processing device 10 may create the co-occurrence management information 12D in advance by using the data and a known co-occurrence degree calculation method.

Returning to FIG. 2, the description will be continued. The co-occurrence word acquisition module 22F acquires a co-occurrence word related to the words that constitute the causal relationship 42 included in the target document 41 from the co-occurrence management information 12D. The co-occurrence word related to the words means a co-occurrence word corresponding to the word and a co-occurrence word for a similar expression of the word. For example, the co-occurrence word acquisition module 22F acquires at least one of the co-occurrence word corresponding to each of the words that constitute the causal relationship 42 included in the target document 41 and the co-occurrence word for the similar expression of the word, from the co-occurrence management information 12D.

Note that the co-occurrence word acquisition module 22F may acquire a co-occurrence word of a word selected by the user from the co-occurrence words related to the words that constitute the causal relationship 42 included in the target document 41.

Note that the acquisition module 22D is not limited to the configuration including the co-occurrence word acquisition module 22F. The acquisition module 22D may not have the co-occurrence word acquisition module 22F. In the present embodiment, the case where the acquisition module 22D includes the co-occurrence word acquisition module 22F is described as an example.

The display control module 22G displays the display screen 50 including the causal relationship 42 included in the target document 41 and the similar expression on the display unit. In the present embodiment, the UI unit 34 corresponds to an example of the display unit. The UI unit 14 provided in the information processing device 10 may be an example of the display unit.

By a display control by the display control module 22G, the display screen 50 including the causal relationship 42 and the similar expression is displayed on the UI unit 34 of the terminal device 30.

Figure 9:
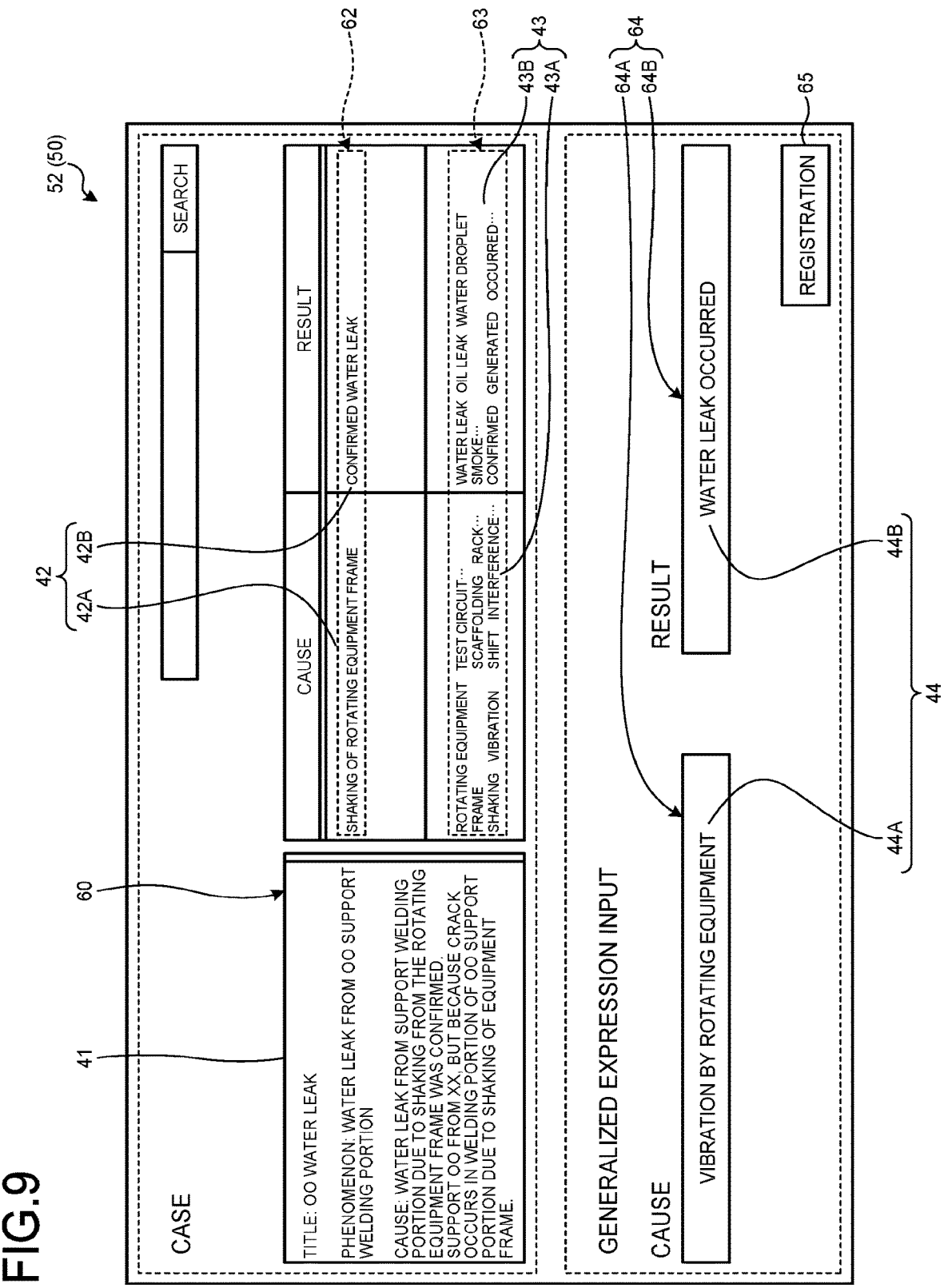
FIG. 9 is a schematic diagram of a display screen according to the embodiment.

FIG. 9 is a schematic diagram illustrating an example of a display screen 52. The display screen 52 is an example of the display screen 50. The display screen 52 includes a target document display area 60, a causal relationship display area 62, a similar expression display area 63, and a generalized expression input field 64. The display screen 52 may be the display screen 50 including at least the causal relationship display area 62, the similar expression display area 63, and the generalized expression input field 64.

The target document display area 60 is a display area of the target document 41. The causal relationship display area 62 is a display area of the causal relationship 42 included in the target document 41. FIG. 9 illustrates, as an example, a form in which one causal relationship 42 is displayed in the causal relationship display area 62.

The similar expression display area 63 is a display area of the similar expression 43 acquired by the similar expression acquisition module 22C. As illustrated in FIG. 9, a similar expression 43A that is the similar expression 43 of the cause 42A displayed in the causal relationship display area 62 and a similar expression 43B that is the similar expression 43 of the result 42B are displayed in the similar expression display area 63.

The generalized expression input field 64 is an input field of the generalized expression 44 corresponding to the causal relationship 42. The generalized expression input field 64 includes an input field 64A and an input field 64B. The input field 64A is an input field of a generalized expression 44A of the cause 42A. The input field 64B is an input field of a generalized expression 44B of the result 42B.

As illustrated in FIG. 9, the display screen 52 includes a causal relationship display area 62 and a similar expression display area 63. Therefore, the user can easily check the generalized expression 44 of the causal relationship 42 and input the generalized expression 44 into the generalized expression input field 64 while visually confirming the causal relationship 42 displayed in the causal relationship display area 62 and the similar expression 43 of the causal relationship 42 displayed in the similar expression display area 63.

Then, the user may operate a registration button 65 after completing the input of the generalized expression 44 into the generalized expression input field 64. By the operation, the terminal device 30 transmits the input generalized expression 44 and the causal relationship ID of the causal relationship 42 that was the processing target when the generalized expression 44 was input to the information processing device 10 via the communication unit 36.

Note that the causal relationship acquisition module 22B may acquire a plurality of causal relationships 42 from the target document 41. In this case, the display control module 22G may display the display screen 50 including the plurality of causal relationships 42 and the similar expression 43 of each of the plurality of causal relationships 42 on the UI unit 34.

Figure 10:
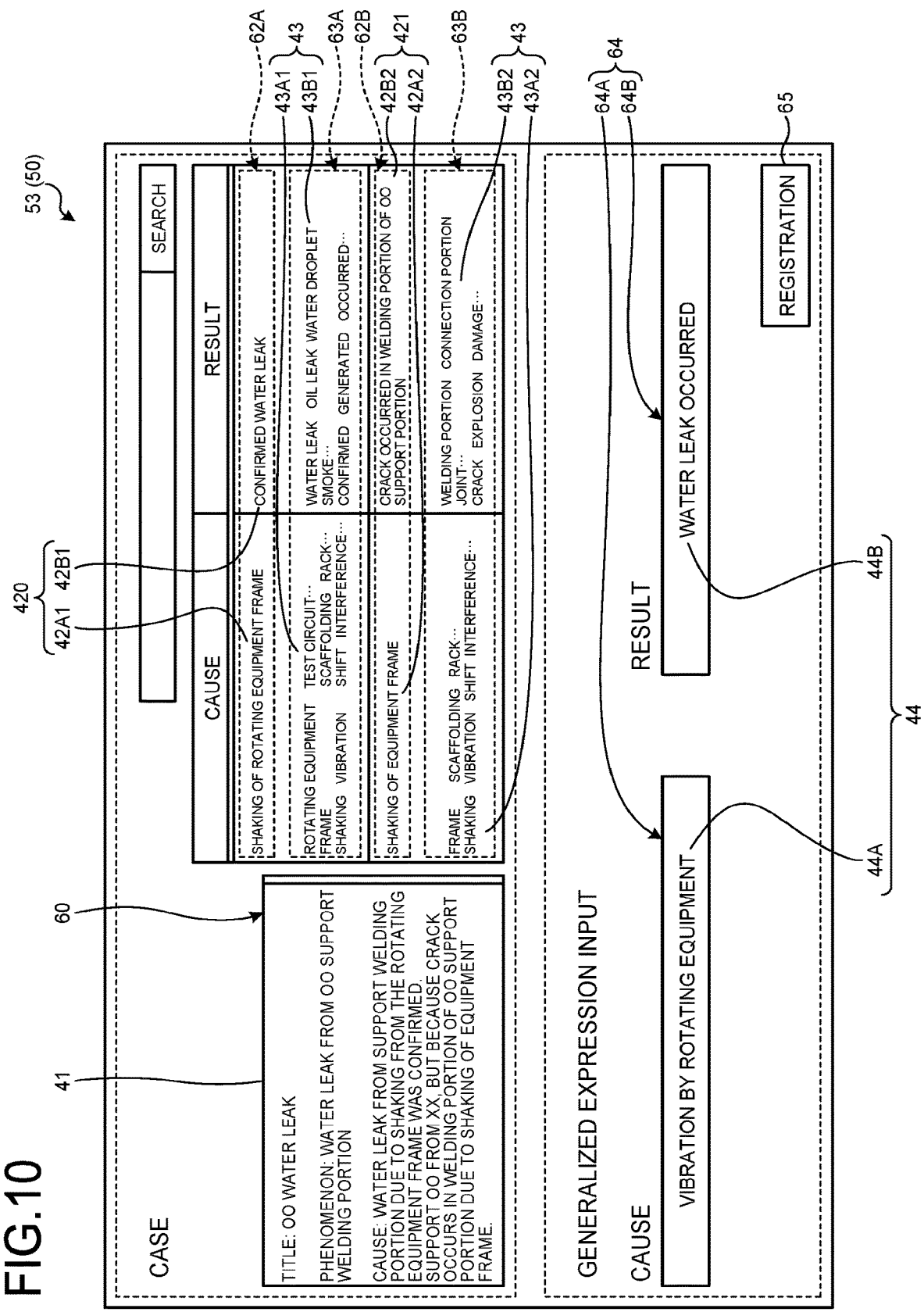
FIG. 10 is a schematic diagram of a display screen according to the embodiment.

FIG. 10 is a schematic diagram illustrating an example of a display screen 53. The display screen 53 is an example of the display screen 50. The display screen 53 includes a target document display area 60, a causal relationship display area 62, a similar expression display area 63, and a generalized expression input field 64.

The display screen 53 has a plurality of causal relationship display areas 62 (causal relationship display area 62A and causal relationship display area 62B) as the causal relationship display area 62. In the causal relationship display area 62A, a causal relationship 420 including a set of a cause 42A1 and a result 42B1 is displayed. In the causal relationship display area 62B, a causal relationship 421 including a set of a cause 42A2 and a result 42B2 is displayed. The causal relationship 420 and the causal relationship 421 are examples of the causal relationship 42.

In addition, the display screen 53 has a plurality of similar expression display areas 63 (similar expression display area 63A and similar expression display area 63B) as the similar expression display area 63. The similar expression display area 63A is a display area of the similar expression 43 (similar expressions 43A1 and 43B1) corresponding to the causal relationship 420 displayed in the causal relationship display area 62A. The similar expression display area 63B is a display area of the similar expression 43 (similar expressions 43A2 and 43B2) corresponding to the causal relationship 421 displayed in the causal relationship display area 62B.

Thus, the display screen 53 may be the display screen 50 displaying the similar expression 43 corresponding to each of the plurality of causal relationships 42 included in the target document 41. In addition, the user can associate the causal relationship with the generalized expression by performing an operation (a plurality of selections are possible) such as setting the causal relationship corresponding to the input generalized expression in a selected state through the display screen 53.

In addition, as described above, the acquisition module 22D of the present embodiment may be configured to include the co-occurrence word acquisition module 22F. In this case, the display control module 22G may display the display screen 50 including the causal relationship 42 of the target document 41, the similar expression 43, and the co-occurrence word 45 on the UI unit 34.

Figure 11:
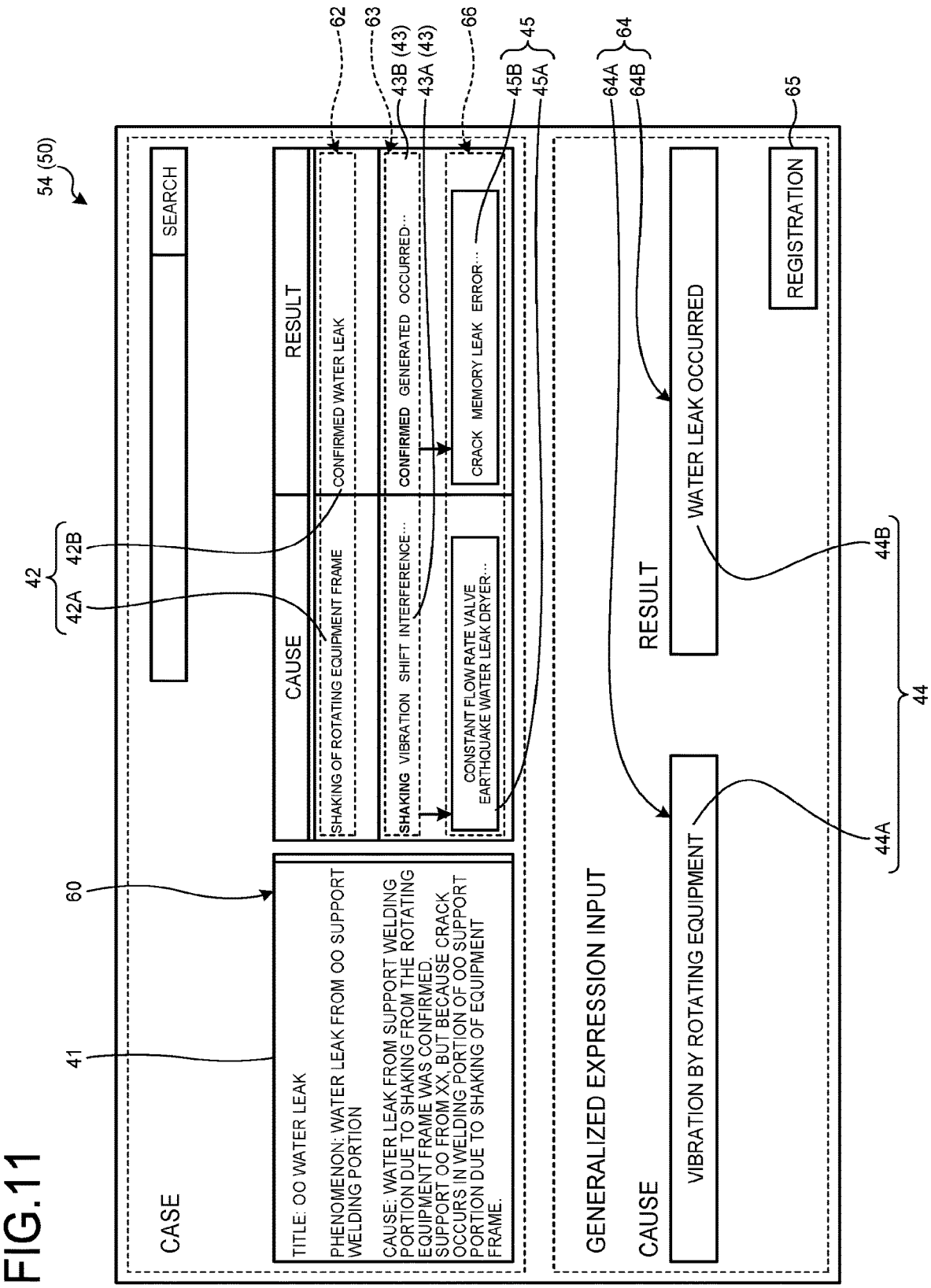
FIG. 11 is a schematic diagram of a display screen according to the embodiment.

FIG. 11 is a schematic diagram illustrating an example of a display screen 54. The display screen 54 is an example of the display screen 50. The display screen 54 includes a target document display area 60, a causal relationship display area 62, a similar expression display area 63, a generalized expression input field 64, and a co-occurrence word display area 66.

The co-occurrence word display area 66 is a display area of the co-occurrence word 45 of the words included in the causal relationship 42. For example, the similar expression 43A of each of the words included in the cause 42A displayed in the causal relationship display area 62 is displayed in the similar expression display area 63, and the co-occurrence word 45A of the selected word among the words is displayed in the co-occurrence word display area 66. In addition, for example, the similar expression 43B of each of the words included in the result 42B displayed in the causal relationship display area 62 is displayed in the similar expression display area 63, and the co-occurrence word 45B of the selected word among the words is displayed in the co-occurrence word display area 66.

Therefore, the user can easily check the generalized expression 44 of the causal relationship 42 and input the generalized expression 44 into the generalized expression input field 64 while visually confirming the causal relationship 42 displayed in the causal relationship display area 62, the similar expression 43 of the causal relationship 42 displayed in the causal relationship display area 62, and the co-occurrence word 45 displayed in the co-occurrence word display area 66.

The main control unit 38 of the terminal device 30 transmits the input generalized expression 44, and the causal relationship ID of the causal relationship 42 that was the processing target when the generalized expression 44 was input to the information processing device 10 via the communication unit 36.

Note that the display control module 22G may display a list of candidates for the generalized expression 44 on the display screen 50.

Figure 12:
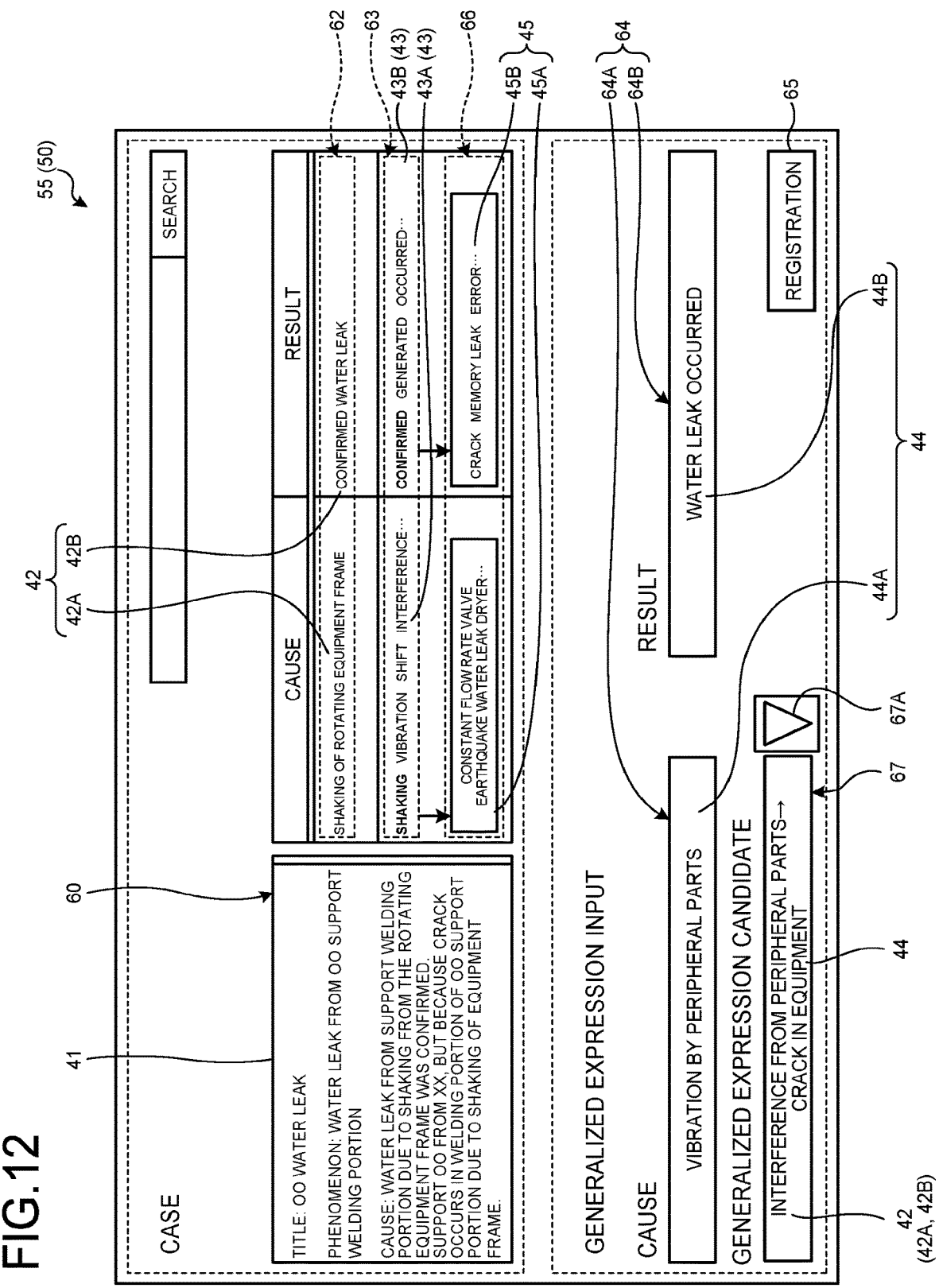
FIG. 12 is a schematic diagram of a display screen according to the embodiment.

FIG. 12 is a schematic diagram illustrating an example of a display screen 55. The display screen 55 is an example of the display screen 50. The display screen 55 includes a target document display area 60, a causal relationship display area 62, a similar expression display area 63, a generalized expression input field 64, a co-occurrence word display area 66, and a candidate selection field 67.

The candidate selection field 67 is a display field of candidates for the generalized expression 44 corresponding to the causal relationship 42 included in the target document 41. The display control module 22G reads the generalized ID corresponding to the causal relationship ID of the causal relationship 42 selected as the processing target from the causal relationship management information 12B (see FIG. 5). Then, the display control module 22G may read the generalized expression 44 corresponding to the read generalized ID from the generalized management information 12E described later and display the generalized expression 44 in the candidate selection field 67.

The display control module 22G may read the generalized IDs of other causal relationships 42 similar to the causal relationship 42 in addition to the generalized ID corresponding to the causal relationship 42 selected as the processing target. In this case, for example, the display control module 22G extracts a keyword from the causal relationship 42 selected by the user, and uses the keyword as a search keyword to search the causal relationship management information 12B for the causal relationship in which the keyword matches. Then, the display control module 22G may read a generalized ID corresponding to the causal relationship 42 of a search result and display the generalized ID in addition to a generalized expression candidate.

By operating a pull-down button 67A, the user may select a desired generalized expression 44 from a list of generalized expressions 44 displayed in the candidate selection field 67.

In this case, the main control unit 38 of the terminal device 30 transmits the generalized expression 44 selected by the user and the causal relationship ID of the causal relationship 42 that was the processing target when the generalized expression 44 was selected to the information processing device 10 via the communication unit 36.

Note that the display screen 50 may be configured to display the similar expression 43 corresponding to the causal relationship 42 selected by the user among the plurality of causal relationships 42 included in the target document 41.

Figure 13:
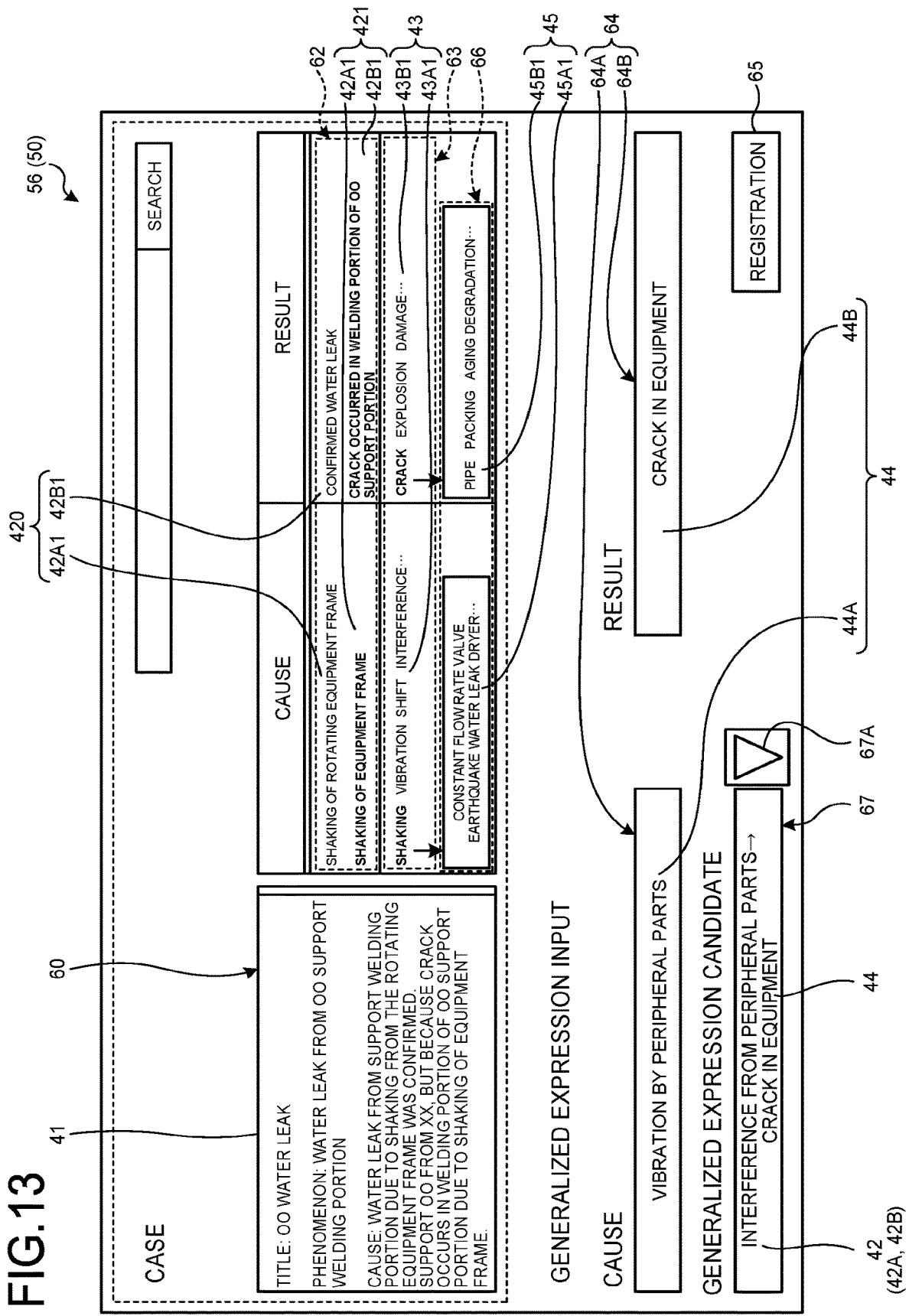
FIG. 13 is a schematic diagram of a display screen according to the embodiment.

FIG. 13 is a schematic diagram illustrating an example of a display screen 56. The display screen 56 is an example of the display screen 50. The display screen 56 includes a target document display area 60, a causal relationship display area 62, a similar expression display area 63, a generalized expression input field 64, a co-occurrence word display area 66, and a candidate selection field 67.

In the causal relationship display area 62 of the display screen 56, a plurality of causal relationships 42 (causal relationship 420 and causal relationship 421) are displayed.

For example, it is assumed that the user operates the UI unit 34 to select the causal relationship 421 from the plurality of causal relationships 42. In this case, the main control unit 38 of the terminal device 30 transmits the causal relationship 420 that has received the selection or the causal relationship ID of the causal relationship 420 to the information processing device 10 via the communication unit 36. The display control module 22G of the information processing device 10 may acquire a similar expression 43 corresponding to the received causal relationship 420 or the causal relationship 420 identified by the causal relationship ID from the similar expression acquisition module 22C, and transmit the similar expression 43 to the terminal device 30. In addition, the display control module 22G may transmit the co-occurrence word 45 corresponding to the similar expression (word in bold) selected by the user among the similar expressions 43 of the causal relationship 421 to the terminal device 30.

Therefore, on the display screen 53 of the terminal device 30, the similar expression 43 (similar expressions 43A1 and 43A2) corresponding to the selected causal relationship 420 are displayed in the similar expression display area 63. In addition, on the display screen 53 of the terminal device 30, the co-occurrence word 45 (co-occurrence word 45A1 and co-occurrence word 45B1) of the selected causal relationship 420 is displayed in the co-occurrence word display area 66.

In this way, the display control module 22G may display the display screen 56 including the similar expression 43 and the co-occurrence word 45 of the causal relationship 42 selected by the user on the UI unit 34 of the terminal device 30.

Returning to FIG. 2, the description will be continued. The reception module 22H receives the input of the generalized expression 44 of the causal relationship 42 displayed on the display screen 50. In the present embodiment, the reception module 22H receives an input of the generalized expression 44 by receiving the generalized expression 44 selected or input by the user from the terminal device 30. In the present embodiment, as described above, the reception module 22H receives the generalized expression 44 and the causal relationship ID of the causal relationship 42 that was the processing target when the generalized expression 44 was input or selected, from the terminal device 30.

Note that the display control module 22G may display the display screen 50 on the UI unit 14 of the information processing device 10. In this case, the reception module 22H may receive the input of the generalized expression 44 from the UI unit 14.

The registration module 22I stores the generalized expression 44 received by the reception module 22H in the storage unit 12 in association with the causal relationship ID of the causal relationship 42 that was the processing target when the generalized expression 44 was input or selected.

In the present embodiment, the registration module 22I registers the generalized expression 44 by updating the causal relationship management information 12B and the generalized management information 12E.

FIG. 14 is a schematic diagram illustrating an example of a data configuration of the generalized management information 12E. The generalized management information 12E is a database in which the generalized ID and the generalized expression 44 of the causal relationship 42 are associated with each other. Note that a data format of the generalized management information 12E is not limited to the database.

The generalized ID is identification information of the generalized expression 44. The generalized expression 44 is configured by of a set of a generalized expression 44A of the cause 42A and a generalized expression 44B of the result 42B.

The registration module 22I registers the generalized expression 44 received by the reception module 22H in the generalized management information 12E, and also adds the generalized ID to the generalized expression 44 to register the generalized expression 44 in the generalized management information 12E. In addition, the registration module 22I associates the generalized ID of the generalized expression 44 registered in the generalized management information 12E with the causal relationship ID of the causal relationship 42 that was the processing target when the generalized expression 44 was input or selected, and registers the associated generalized ID and casual relationship ID in the causal relationship management information 12B (see FIG. 5).

Through the processing, the registration module 22I stores the generalized expression 44 in the storage unit 12.

For example, it is assumed that the user uses a specific search query to search for the document 40 related to the search query. In this case, the control unit 18 of the information processing device 10 searches for the causal relationship 42 including the received search query from the causal relationship management information 12B, and searches for the generalized expression 44 corresponding to the generalized ID associated with the causal relationship 42 from the generalized management information 12E. Then, the control unit 18 of the information processing device 10 searches for the document 40 including the searched causal relationship 42 and generalized expression 44 from the plurality of documents 40 registered in the document management information 12A.

Therefore, the information processing device 10 can search for the input search query or the document 40 including the generalized expression 44 for the search query from the document management information 12A.

Therefore, the information processing device 10 can search for the document 40 related to the input search query from the plurality of types of documents 40 belonging to a plurality of types of categories, without depending on the category to which the document 40 including the search query belongs.

Next, an example of a flow of information processing executed by the information processing device 10 will be described.

Figure 15:
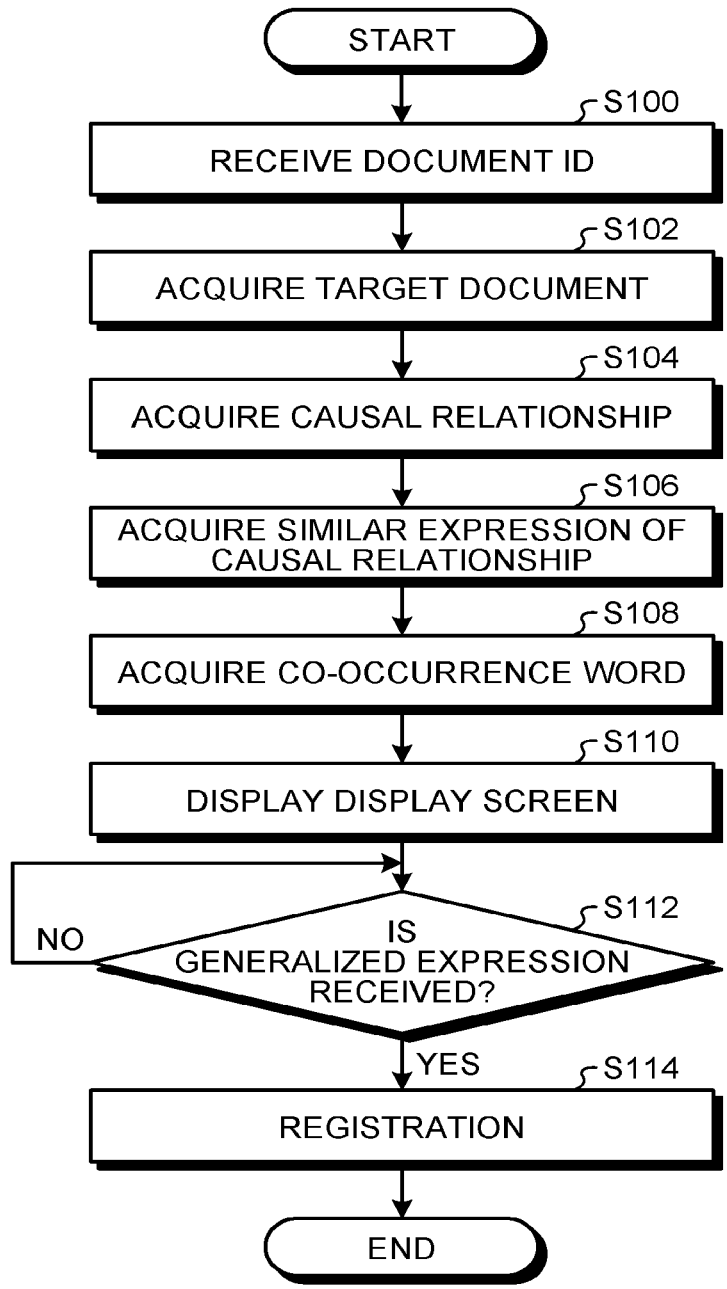
FIG. 15 is a flowchart illustrating a flow of information processing executed by the information processing device according to the embodiment.

FIG. 15 is a flowchart illustrating an example of a flow of information processing executed by the information processing device 10 of the present embodiment.

The target document acquisition module 22A receives the document ID from the terminal device 30 (step S100). The target document acquisition module 22A acquires the document 40 as the target document 41 by reading the document 40 corresponding to the document ID received in step S100 from the document management information 12A (step S102).

Next, the causal relationship acquisition module 22B acquires the causal relationship 42 corresponding to the document ID received in step S100 from the causal relationship management information 12B (step S104). Through the processing of step S104, the causal relationship acquisition module 22B acquires one or a plurality of causal relationships 42 included in the target document 41 acquired in step S102. Note that as described above, the causal relationship acquisition module 22B may acquire the causal relationship 42 selected by the user from the plurality of causal relationships 42 included in the target document 41.

Next, the similar expression acquisition module 22C acquires the similar expression 43 of the causal relationship 42 acquired in step S104 using the feature management information 12C (step S106). Note that as described above, the similar expression acquisition module 22C may acquire the similar expression 43 using the priority determination result of the priority determination module 22E. In addition, as described above, the similar expression acquisition module 22C may acquire the similar expression 43 of a predetermined part of speech.

Next, the co-occurrence word acquisition module 22F acquires the co-occurrence words of the words that constitute the causal relationship 42 included in the target document 41 acquired in step S102 from the co-occurrence management information 12D (step S108). Note that as described above, the processing of step S108 may be omitted.

Next, the display control module 22G displays the display screen 50 on the UI unit 34 of the terminal device 30 (step S110). The display screen 50 includes the causal relationship 42 acquired in step S104 and the similar expression 43 acquired in step S106. In addition, as described above, the display screen 50 may further include the co-occurrence words 45 acquired in step S108, the target document 41, and the like, in addition to the causal relationship 42 and the similar expression 43.

The user inputs or selects the generalized expression 44 of the causal relationship 42 while visually checking the causal relationship 42, the similar expression 43, the target document 41, and the co-occurrence word 45 displayed on the display screen 50. The conversion support processing module 22 repeats a negative determination (step S112: No) until it is determined that the generalized expression 44 is received from the terminal device 30. When the conversion support processing module 22 determines that the generalized expression 44 has been received from the terminal device 30 (step S112: Yes), the processing proceeds to step S114.

When a positive determination is made in step S112 (step S112: Yes), the registration module 22I receives the generalized expression 44 that has been input or selected, and the causal relationship ID of the causal relationship 42 that was the processing target when the generalized expression 44 was input, from the terminal device 30.

The registration module 22I associates the generalized expression 44 received in step S112 with the causal relationship ID of the causal relationship 42 that was the processing target when the generalized expression 44 was input or selected, and resisters the associated generalized expression 44 and causal relationship ID in the causal relationship management information 12B and the generalized management information 12E (step S114). Then, the present routine ends.

Note that when the causal relationship acquisition module 22B acquires a plurality of causal relationships 42 in step S104, the plurality of causal relationships 42 may be displayed on the UI unit 34, and the processing of steps S106 to S114 may be executed for the causal relationship 42 selected by the user.

As described above, the information processing device 10 of the present embodiment includes the causal relationship acquisition module 22B, the similar expression acquisition module 22C, and the acquisition module 22D. The causal relationship acquisition module 22B acquires the causal relationship 42 included in the target document 41 that is the specific document 40 from the causal relationship management information 12B. The causal relationship management information 12B is registered with one or a plurality of causal relationships 42, which are extracted from one or a plurality of documents 40 and are configured by a set of the first element (cause 42A) and the second element (result 42B) having a relationship. The similar expression acquisition module 22C acquires the similar expression 43 of the causal relationship 42 included in the target document 41 based on the feature management information 12C. The feature of each of the plurality of words included in the one or the plurality of documents 40 is registered in the similar expression acquisition module 22C. The acquisition module 22D acquires the generalized expression 44 of the causal relationship 42 included in the target document 41 based on the causal relationship 42 included in the target document 41 and the similar expression 43.

Here, in the related art, in order to obtain the causal relationship of generalized expressions, it is necessary to prepare an important word dictionary and a generalized dictionary in advance, and maintenance of the dictionaries is necessary. In addition, in order to obtain a generalized expression of the causal relationship included in a plurality of documents in different categories, it was necessary to perform conversion in consideration of the meaning of the causal relationship with the user, not simple conversion. Therefore, in the conventional technology, it may be difficult to improve a conversion efficiency of the causal relationship included in a target document into the generalized expression.

On the other hand, the information processing device 10 of the present embodiment acquires the causal relationship 42 of the target document 41 from the causal relationship management information 12B. In addition, the information processing device 10 of the present embodiment acquires the similar expression 43 of the causal relationship 42 from the feature management information 12C. Then, the information processing device 10 acquires the generalized expression 44 of the causal relationship 42 included in the target document 41 using the causal relationship 42 of the target document 41 and the similar expression 43 of the causal relationship 42.

Therefore, in the information processing device 10 of the present embodiment, a generalized expression 44 that does not depend on the category to which the target document 41 belongs can be easily acquired for the causal relationship 42 included in the target document 41 without using the dictionary such as the important word dictionary or the generalized dictionary.

Accordingly, in the information processing device 10 of the present embodiment, it is possible to improve the conversion efficiency of the causal relationship 42 included in the target document 41 into the generalized expression 44.

In addition, in the information processing device 10 of the present embodiment, the acquisition module 22D includes the display control module 22G, the reception module 22H, and the registration module 22I. The display control module 22G displays the display screen 50 including the causal relationship 42 included in the target document 41 and the similar expression 43 on the UI unit 34. The reception module 22H receives the input of the generalized expression 44 of the causal relationship 42 displayed on the display screen 50. The registration module 22I registers the received generalized expression 44 as the generalized expression 44 of the causal relationship 42.

As described above, the information processing device 10 of the present embodiment displays the display screen 50 including the causal relationship 42 included in the target document 41 and the similar expression 43 of the causal relationship 42 on the UI unit 34. Therefore, the user can easily recall another similar expression by visually recognizing the causal relationship 42 and the similar expression 43 and easily input the generalized expression 44.

Therefore, the information processing device 10 of the present embodiment can effectively support the conversion into the generalized expression 44, in addition to the effects described above.

In addition, in the information processing device 10 of the present embodiment, the acquisition module 22D stores the acquired generalized expression 44 in the storage unit 12 in association with the causal relationship ID of the causal relationship 42 that was the processing target when the generalized expression 44 was acquired. For example, the registration module 22I registers the generalized expression 44 received by the reception module 22H in the generalized management information 12E, and also adds the generalized ID to the generalized expression 44 to register the generalized expression 44 in the generalized management information 12E. In addition, the registration module 22I associates the generalized ID of the generalized expression 44 registered in the generalized management information 12E with the causal relationship ID of the causal relationship 42 that was the processing target when the generalized expression 44 was input or selected, and registers the associated generalized ID and casual relationship ID in the causal relationship management information 12B (see FIG. 5).

Therefore, the information processing device 10 can search for the document 40 related to the input search query from the plurality of types of documents 40 belonging to a plurality of types of categories, without depending on the category to which the document 40 including the input search query belongs.

Here, it is assumed that the document 40 is case data of a trouble. In order to avoid the trouble, it is important for the user to grasp past troubles and not to repeat the same trouble. For example, in the case of products used in thermal power, hydraulic power, and nuclear power plants, building air-conditioning management systems, water and sewer management systems, and the like, due to long service life thereof, the number of new product designs involving one designer is limited.

For this reason, in the past, regarding the past troubles and countermeasures thereof, it was largely dependent on the knowledge of veteran designers. For this reason, in the past, there was a risk that necessary knowledge would be lost if it could not be passed on in the form of instruction to young designers.

Therefore, in recent years, case data (documents) such as phenomena, causes, and countermeasures of the troubles that occurred in the past have been compiled into a database, and when a new product is designed, a search system that refers to past documents generated by existing similar products has been introduced.

However, the conventional search system searches for all the documents registered in the database and searches for a document including an input search query, and thus, a large number of unintended documents may be searched. Therefore, conventionally, it may take time to select a document required by the user from a large number of obtained search results. In addition, when a young designer with little design experience searches for the documents using the conventional search system, it may be difficult to determine whether the searched document is a document related to a current design. In addition, conventionally, since only documents including the input search query are searched, documents including synonymous words having different notations have not been searched.

In addition, when the categories are different, different notations may be given even if the words have similar meanings. Therefore, in the related art, it may be difficult to search for an intended document even when a synonym dictionary or the like is used.

In addition, as described above, in the related art in which the important word dictionary and the generalized dictionary are prepared in advance, maintenance of the dictionaries is required. In addition, in the related art, in order to obtain the generalized expression of the causal relationship included in the plurality of documents in different categories, it was necessary to perform conversion in consideration of the meaning of the causal relationship with the user, not simple conversion.

Therefore, in the related art, it was difficult to search for the document 40 related to the input search query from the plurality of types of documents 40 belonging to a plurality of types of categories, without depending on the category to which the document 40 including the input search query belongs.

On the other hand, in the information processing device 10 of the present embodiment, the acquisition module 22D acquires the generalized expression 44 of the causal relationship 42 based on the causal relationship 42 acquired by the causal relationship acquisition module 22B, and the similar expression 43 acquired by the similar expression acquisition module 22C. Then, the acquisition module 22D stores the acquired generalized expression 44 in the storage unit 12 in association with the causal relationship ID of the causal relationship 42 that was the processing target when the generalized expression 44 was acquired.

Therefore, the information processing device 10 of the present embodiment can search for the document 40 related to the input search query from the plurality of types of documents 40 belonging to a plurality of types of categories, without depending on the category to which the document 40 including the search query belongs, in addition to the effects described above.

For example, it is assumed that the user uses a specific search query to search for the document 40 related to the search query. In this case, the control unit 18 of the information processing device 10 searches for the causal relationship 42 including the received search query from the causal relationship management information 12B, and searches for the generalized expression 44 corresponding to the generalized ID associated with the causal relationship 42 from the generalized management information 12E. Then, the control unit 18 of the information processing device 10 searches for the document 40 including the searched causal relationship 42 and generalized expression 44 from the plurality of documents 40 registered in the document management information 12A.

Thus, in the information processing device 10, the cause 42A and the result 42B included in the causal relationship 42, and the generalized expression 44 can be used as the search target of the input search query. Therefore, the information processing device 10 can increase a possibility that the document 40 intended by the user is searched. In addition, the information processing device 10 of the present embodiment can also search for the similar expression 43 of the causal relationship 42, and thus suppress the document 40 that is not the search target because the expression is different from the search query.

Modification

In the embodiment, the form in which the acquisition module 22D provides the user with the display screen 50 including at least the causal relationship 42 and the similar expression 43, and receives the generalized expression 44 input or selected by the user to acquire the generalized expression 44 has been described as an example.

However, the acquisition module 22D may be configured to acquire the generalized expression 44 based on the causal relationship 42 of the target document 41 and the similar expression 43 of the causal relationship 42 without the input of the user.

Figure 16:
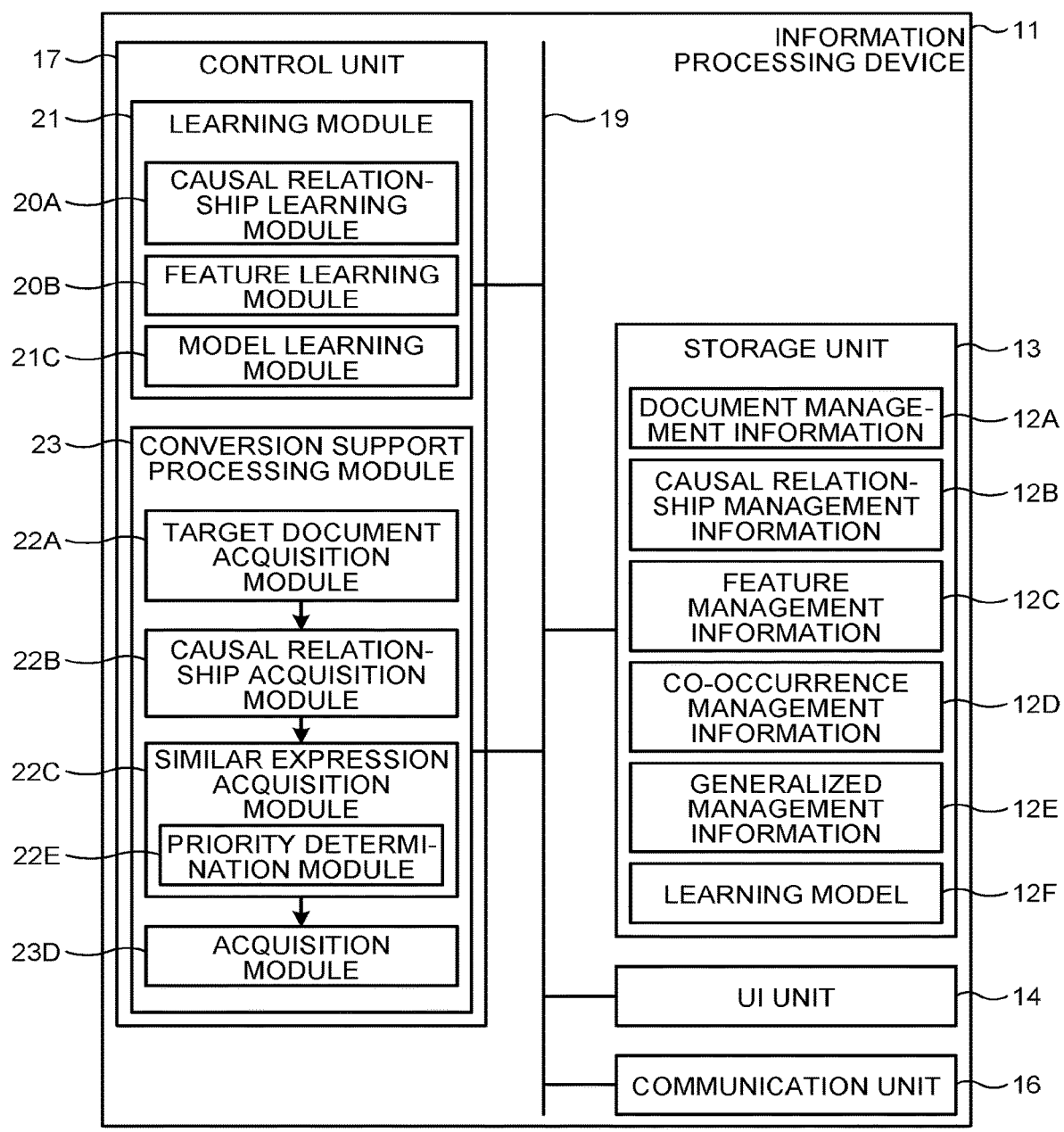
FIG. 16 is a block diagram illustrating a functional configuration of an information processing device according to the embodiment.

FIG. 16 is a block diagram illustrating an example of a functional configuration of an information processing device 11 of the present modification. Note that parts having the same functions and configurations as those of the information processing device 10 of the embodiment described above are given the same reference numerals, and detailed description thereof will be omitted.

The information processing device 11 includes a storage unit 13, a UI unit 14, a communication unit 16, and a control unit 17. The storage unit 13, the UI unit 14, the communication unit 16, and the control unit 17 are connected via a bus 19 so that data or signals can be exchanged.

The storage unit 13 stores document management information 12A, causal relationship management information 12B, feature management information 12C, co-occurrence management information 12D, generalized management information 12E, and a learning model 12F. That is, the storage unit 13 is the same as the storage unit 12 of the embodiment described above except that the learning model 12F is further stored.

The learning model 12F is a model for acquiring the generalized expression 44 of the causal relationship 42 from the causal relationship 42 included in the target document 41 and the similar expression 43. The learning model 12F is learned by a model learning module 20C described later.

The control unit 17 includes a learning module 21 and a conversion support processing module 23. The learning module 21 includes a causal relationship learning module 20A, a feature learning module 20B, and a model learning module 21C. The learning module 21 is the same as the learning module 20 of the embodiment described above except that the model learning module 21C is further included.

The model learning module 21C learns the learning model 12F. For example, the learning module 21F uses a set of the causal relationship 42 and the generalized expression 44 as learning data, and learns a model for acquiring the generalized expression 44 of the causal relationship 42 from the learning data by using known machine learning. Note that the model learning module 21C may use the causal relationship 42, the similar expression 43, the co-occurrence word 45 of the causal relationship 42, and the generalized expression 44 that is a correct answer, as the learning data.

The conversion support processing module 23 includes a target document acquisition module 22A, a causal relationship acquisition module 22B, a similar expression acquisition module 22C, and an acquisition module 23D. The conversion support processing module 23 is the same as the conversion support processing module 22 of the embodiment described above except that the acquisition module 22D is replaced with the acquisition module 23D.

The acquisition module 23D inputs the causal relationship 42 acquired by the causal relationship acquisition module 22B and the similar expression 43 acquired by the similar expression acquisition module 22C to the learning model 12F as input data. By the processing, the acquisition module 23D acquires the generalized expression 44 as output data from the learning model 12F.

Note that the acquisition module 23D may be configured to include the co-occurrence word acquisition module 22F, similarly to the acquisition module 22D of the information processing device 10 of the embodiment described above. In this case, the acquisition module 23D may input the causal relationship 42 acquired by the causal relationship acquisition module 22B, the similar expression 43 acquired by the similar expression acquisition module 22C, and the co-occurrence word 45 acquired by the co-occurrence word acquisition module 22F to the learning model 12F as input data. By the processing, the acquisition module 23D acquires the generalized expression 44 as output data from the learning model 12F.

As described above, the acquisition module 23D may acquire the generalized expression 44 of the causal relationship 42 from the causal relationship 42 included in the target document 41 and the similar expression 43 of the causal relationship 42 by using the learning model 12F.

Next, an example of the hardware configurations of the information processing device 10, the information processing device 11, and the terminal device 30 in the embodiment and modification described above will be described.

Figure 17:
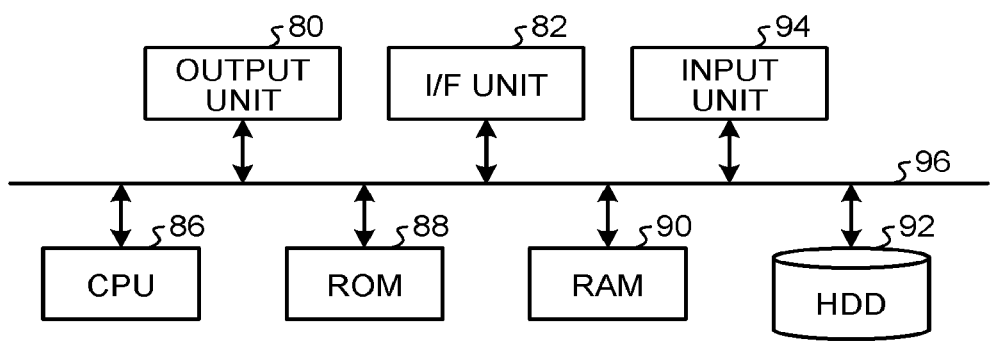
FIG. 17 is a hardware configuration diagram of the information processing device and the terminal device according to the embodiment.

FIG. 17 is an example of a hardware configuration diagram of the information processing device 10, the information processing device 11, and the terminal device 30 according to the embodiment and modification described above.

The information processing device 10, the information processing device 11, and the terminal device 30 include a control device such as a CPU 86, a storage device such as a read only memory (ROM) 88 or a random access memory (RAM) 90 or a hard disk drive (HDD) 92, an I/F unit 82 that is an interface with various devices, an output unit 80 that outputs various types of information such as output information, an input unit 94 that receives user operations, and a bus 96 that connects the respective units, and have a hardware configuration using a normal computer.

In the information processing device 10, the information processing device 11, and the terminal device 30, the CPU 86 reads out a program from the ROM 88 onto the RAM 90 and executes the program to implement the respective modules on the computer.

Note that the program for executing each processing executed by the information processing device 10, the information processing device 11, and the terminal device 30 may be stored in the HDD 92. In addition, a program for executing each processing executed by the information processing device 10, the information processing device 11, and the terminal device 30 may be provided by being incorporated in the ROM 88 in advance.

In addition, the program for executing the processing executed by the information processing device 10, the information processing device 11, and the terminal device 30 may be provided as a computer program product that is stored in a computer-readable storage medium such as a CD-ROM, a CD-R, a memory card, a digital versatile disk (DVD), or a flexible disk (FD) in a file in an installable format or an executable format. In addition, the program for executing the processing executed by the information processing device 10, the information processing device 11, and the terminal device 30 may be stored on a computer connected to a network such as the Internet, and provided by being downloaded via the network. In addition, the program for executing the processing executed by the information processing device 10, the information processing device 11, and the terminal device 30 may be provided or distributed via the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more hardware processors configured to:
extract, from each of a plurality of documents, a plurality of causal relationships, each of the causal relationships including a set of a first element and a second element having a relationship therebetween;
register the extracted causal relationships in causal relationship management information;
learn a feature amount of each of a plurality of words included in each of the plurality of documents;
register the feature amounts in feature management information;
acquire a causal relationship included in a target document from the causal relationship management information;
acquire, with respect to the causal relationship included in the target document, a similar expression having a similar feature amount to at least one of a feature amount of the first element and a feature amount of the second element included in the causal relationship based on the feature management information;
determine a priority of each of words registered in the feature management information;
acquire, among the words registered in the feature management information, a group of words having a higher priority than a predetermined first priority from words having a similar feature amount to the feature amount of the first element or the feature amount of the second element that constitutes the causal relationship in the target document as the similar expression; and
acquire, with respect to the causal relationship included in the target document, a generalized expression obtained by generalizing an expression of the at least one of the first element and the second element included in the causal relationship,
wherein the generalized expression is not limited to a specific expression within a category.

2. The device according to claim 1, wherein the hardware processor is configured to:
display a display screen including the causal relationship included in the target document and the similar expression on a display unit;

receive an input of the generalized expression of the causal relationship displayed on the display screen; and register the received generalized expression of the causal relationship.

3. The device according to claim 2, wherein the hardware processor is configured to:

display the display screen including the causal relationship included in the target document, the similar expression, and a selection screen of generalized expression candidates of the causal relationship on the display unit; and receive an input of a selected generalized expression selected from the generalized expression candidates of the selection screen.

4. The device according to claim 1, wherein the hardware processor is configured to acquire the generalized expression of the causal relationship using a learning model for acquiring the generalized expression of the causal relationship from the causal relationship included in the target document and the similar expression.

5. The device according to claim 1, wherein the hardware processor is configured to acquire, from among words registered in the feature management information, one or more groups of words having a similar feature amount to the feature amount of the first element or the feature amount of the second element that constitutes the causal relationship in the target document as the similar expression.

6. The device according to claim 1, wherein the hardware processor is configured to:

specify, among the words registered in the feature management information, a category to which the target document belongs, and determine a higher priority for a word whose appearance count is greater in documents belonging to other categories other than the specified category.

7. The device according to claim 1, wherein the hardware processor is configured to acquire, among words registered in the feature management information, a group of words having a similar feature amount to the at least one of the feature amount of the first element or the feature amount of the second element of a predetermined part of speech that constitutes the causal relationship in the target document as the similar expression of the causal relationship.

8. The device according to claim 1, wherein the hardware processor is configured to:

acquire, with respect to a word that constitutes the causal relationship included in the target document, co-occurrence words, each of the co-occurrence words being another word that has a high probability of being used together with the word; and acquire the generalized expression based on the causal relationship included in the target document, the similar expression, and the co-occurrence words.

9. The device according to claim 8, wherein the hardware processor is configured to acquire, among co-occurrence words related to the first element or the second element that constitutes the causal relationship included in the target document in co-occurrence management information in which co-occurrence words of the plurality of words are registered, a co-occurrence word corresponding to a word for which selection is received.

10. The device according to claim 1, wherein the hardware processor is configured to acquire a selected causal relationship among the plurality of causal relationships acquired from the causal relationship management information.

11. An information processing system comprising:
an information processing device; and
a terminal device that communicates with the information processing device,
the information processing device comprising:
one or more hardware processors configured to:

extract, from each of a plurality of documents, a plurality of causal relationships, each of the causal relationships including a set of a first element and a second element having a relationship therebetween;

register the extracted causal relationships in causal relationship management information;

learn a feature amount of each of a plurality of words included in each of the plurality of documents;

register the feature amounts in feature management information;

acquire a causal relationship included in a target document from the causal relationship management information;

acquire, with respect to the causal relationship included in the target document, a similar expression having a similar feature amount to at least one of a feature amount of the first element and a feature amount of the second element included in the causal relationship based on the feature management information;

determine a priority of each of words registered in the feature management information;

acquire, among the words registered in the feature management information, a group of words having a higher priority than a predetermined first priority from words having a similar feature amount to the feature amount of the first element or the feature amount of the second element that constitutes the causal relationship in the target document as the similar expression;

acquire, with respect to the causal relationship included in the target document, a generalized expression obtained by generalizing an expression of the at least one of the first element and the second element included in the causal relationship, the generalized expression being not limited to a specific expression within a category;

display a display screen including the causal relationship included in the target document and the similar expression on a display unit of the terminal device;

receive an input of the generalized expression of the causal relationship displayed on the display screen; and register the received generalized expression of the causal relationship.

12. A computer program product comprising a non-transitory computer-readable medium including programmed instructions, the instructions causing a computer to execute:

extracting, from each of a plurality of documents, a plurality of causal relationships, each of the causal relationships including a set of a first element and a second element having a relationship therebetween;

registering the extracted causal relationships in causal relationship management information;

learning a feature amount of each of a plurality of words included in each of the plurality of documents;

registering the feature amounts in feature management information;

acquiring a causal relationship included in a target document from the causal relationship management information;

acquiring, with respect to the causal relationship included in the target document, a similar expression having a similar feature amount to at least one of a feature amount of the first element and a feature amount of the second element included in the causal relationship based on the feature management information;

determining a priority of each of words registered in the feature management information;

acquiring, among the words registered in the feature management information, a group of words having a higher priority than a predetermined first priority from words having a similar feature amount to the feature amount of the first element or the feature amount of the second element that constitutes the causal relationship in the target document as the similar expression; and acquiring, with respect to the causal relationship included in the target document, a generalized expression obtained by generalizing an expression of the at least one of the first element and the second element included in the causal relationship, wherein the generalized expression is not limited to a specific expression within a category.

* * * * *